(12) United States Patent
Ivanov et al.

(10) Patent No.: US 11,570,581 B2
(45) Date of Patent: Jan. 31, 2023

(54) UPDATING A RADIO MAP BASED ON A SEQUENCE OF RADIO FINGERPRINT

(71) Applicant: HERE Global B.V., Eindhoven (NL)

(72) Inventors: Pavel Ivanov, Tampere (FI); Henri Jaakko Julius Nurminen, Tampere (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 49 days.

(21) Appl. No.: 17/195,940

(22) Filed: Mar. 9, 2021

(65) Prior Publication Data

US 2021/0289323 A1   Sep. 16, 2021

(30) Foreign Application Priority Data

Mar. 12, 2020  (EP) .................................... 20162824

(51) Int. Cl.
*H04W 4/029*   (2018.01)
*G01S 5/02*   (2010.01)

(52) U.S. Cl.
CPC ......... *H04W 4/029* (2018.02); *G01S 5/02525* (2020.05)

(58) Field of Classification Search
CPC ........................... H04W 4/029; G01S 5/02525
USPC ...................................................... 455/456.1
See application file for complete search history.

(56) References Cited

U.S. PATENT DOCUMENTS 10,397,739 B2   8/2019  Ivanov et al.
10,542,386 B2   1/2020  Ivanov et al.

2013/0017842 A1  1/2013  Gupta et al.
2015/0133148 A1  5/2015  Yang et al.
2015/0237164 A1  8/2015  Mohammad Mirzaei et al.
(Continued)

FOREIGN PATENT DOCUMENTS

JP   2009-055138   3/2009
JP   2017-015562   1/2017
KR   20190112611 A  10/2019

OTHER PUBLICATIONS

Extended European Search Report for European Application No. 20162824.5 dated Sep. 17, 2020, 9 pages.
(Continued)

*Primary Examiner* — Ted M Wang
(74) *Attorney, Agent, or Firm* — Alston & Bird LLP

(57) ABSTRACT

A method, apparatus and computer readable storage medium permit an updated radio map to be determined. In an iteration, the method obtains or holds available current radio map data representing a current radio map for a site and track data of a mobile device. The track data includes sensor data and radio signal observation data representing sets of radio signal observation results captured at different observation positions. The method estimates the observation positions on the track based on the current radio map data and the track data including the sensor data and the radio signal observation data and associates each estimated observation position with a respective set of radio signal observation results represented by the radio signal observation data to determine a sequence of radio fingerprints for the track. The method provides or uses the sequence of radio fingerprints for determining an updated radio map for the site.

20 Claims, 5 Drawing Sheets

(56) References Cited

U.S. PATENT DOCUMENTS

| | | |
|---|---|---|
| 2016/0090096 A1 | 3/2016 | Cauthen |
| 2016/0161592 A1 | 6/2016 | Wirola et al. |
| 2017/0272900 A1 | 9/2017 | Do et al. |
| 2017/0343639 A1 | 11/2017 | Ivanov et al. |
| 2018/0167783 A1* | 6/2018 | Khoche ............ G06K 19/07773 |
| 2018/0255430 A1* | 9/2018 | Ivanov ................. G01S 5/0252 |
| 2019/0253957 A1 | 8/2019 | Tod et al. |
| 2019/0373413 A1 | 12/2019 | Kong et al. |

OTHER PUBLICATIONS

Luo et al., "MPiLoc: Self-Calibrating Multi-Floor Indoor Localization Exploiting Participatory Sensing", IE Transactions on Mobile Computing, vol. 17, No. 1 (Jan. 1, 2018), 14 pages.

Office Action for Japanese Application No. 2021-036962 dated Mar. 15, 2022, 3 pages.

Decision to Grant for Japanese Application No. 2021-036962 dated Sep. 20, 2022, 5 pages.

* cited by examiner

UPDATING A RADIO MAP BASED ON A SEQUENCE OF RADIO FINGERPRINT

CROSS-REFERENCE TO RELATED APPLICATIONS

This application claims priority to European Application No. 20162824.5, filed Mar. 12, 2020, the entire contents of which are incorporated herein by reference

FIELD OF THE DISCLOSURE

The invention relates to the field of non-GNSS based positioning, for example to the field of updating a radio map for a non-GNSS based positioning system based on a sequence of radio fingerprints.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems.

Such a non-GNSS based radio positioning system (e.g. a self-contained positioning system) may be divided in at least three stages, an installation stage, a training stage and a positioning stage.

In the installation stage, dedicated positioning support radio nodes (e.g. Bluetooth beacons) may be installed in the environment for which a positioning system is to be provided. Alternatively or additionally, a non-GNSS based radio positioning system may make use of existing radio nodes like WLAN access points or cellular network nodes as positioning support radio nodes.

In the subsequent training stage, training data are collected. The training data may be collected in the form of radio fingerprints. A radio fingerprint may indicate an estimated observation position and a set of radio signal observation results captured when scanning for radio signals at the observation position.

The observation position may for example be a GNSS satellite signal based position. However, when collecting radio fingerprints inside a building in the training stage, it is often not possible to determine a GNSS satellite signal based position.

The training may be a continuous background process, in which mobile devices of a large number of consumers are continuously reporting collected radio fingerprints to a positioning server. Consumers may consent to a participation in such a radio fingerprint collection, if their device is equipped with the needed functionality. This approach is also referred to as crowd-sourcing. Since crow-sourcing is a background process that does not directly benefit the device user, it is desirable that the crowd-sourcing process only consumes limited resources of the device.

Alternatively or additionally, mobile devices may be used for collecting radio fingerprints in a systematic manner. Collected radio fingerprints may be uploaded to the positioning server, where algorithms may be run to generate and/or update radio maps for positioning purposes.

In the positioning stage, a mobile device may estimate its current position based on own measurements taken from the radio interface and on radio map that is available from the training stage.

SUMMARY OF SOME ASPECTS OF THE INVENTION

In this section, aspects of the invention are disclosed.

According to a first aspect, a method is disclosed which comprises in at least one iteration:
obtaining or holding available current radio map data representing a current radio map for a site;
obtaining or holding available track data of a mobile device, wherein the track data include:
sensor data captured by one or more sensors of the mobile device when moving along a track on the site, and
radio signal observation data representing sets of radio signal observation results captured by a radio interface of the mobile device at different observation positions on the track;
estimating the observation positions based on the current radio map data and the track data including the sensor data and the radio signal observation data;
associating each of the estimated observation positions with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data; and
providing or using the sequence of radio fingerprints for determining an updated radio map for the site.

According to a second aspect, a method is disclosed which comprises in at least one iteration:
obtaining or holding available current radio map data representing a current radio map for a site;
obtaining a sequence of radio fingerprints, wherein each radio fingerprint of the sequence of radio fingerprints represents a respective estimated observation position of a mobile device on a track on the site and a respective set of radio signal observation results captured by a radio interface of the mobile device, wherein the estimated observation position is/was determined based on the current radio map data and track data including sensor data captured by at least one sensor of the mobile device when moving along the track and radio signal observation data representing sets of radio signal observation results captured by a radio interface of the mobile device at different observation positions on the track; and
determining an updated radio map for the site based on the sequence of radio fingerprints.

In the following, further exemplary features of the methods according to the first and second aspects are described.

The methods according to the first and second aspects may serve for determining the updated radio map for the site, in particular for determining the updated radio map for the site based on the sequence of radio fingerprints.

The methods according to the first and second aspects are performed by one or more apparatuses (e.g. one or more of the apparatuses disclosed below). The method according to the first aspect may be performed by one apparatus, preferably the mobile device; and the method according to the second aspect may be performed by another apparatus, preferably a server. Accordingly, the disclosed method according to the first aspect may relate to actions performed by the mobile device and, thus, may be referred to as mobile device-side method; and the disclosed method according to the second aspect relates to actions performed by a server and, thus, may be referred to as server-side method.

Alternatively, at least one of the methods according to the first and second aspects may be performed by at least two apparatuses, preferably the mobile device and a server, cooperating together to perform the respective method.

Moreover, the methods according to the first and second aspects may be performed iteratively in more than one iteration. It is to be understood that the data (e.g. current map data and track data) obtained or hold available may be different respectively in each iteration of the methods according to the first and/or second aspects.

Moreover, the methods according to the first and second aspects may be understood to be interrelated in such a way that they relate to the same current radio map, the same sequence of radio fingerprints and the same updated radio map. A disclosure relating to the current radio map, the sequence of radio fingerprints and the updated radio map is thus to be understood to be a disclosure for the methods according to the first and second aspects.

The site may be a predetermined environment, for example a predetermined indoor and/or urban environment like inside and/or outside of a building or a complex of buildings (e.g. a shopping center, a parking garage, a train station, a bus station, an airport, a company site, etc). On the site, the availability of global navigation satellite system (GNSS) satellite signals may for example be limited so that the mobile device cannot reliably estimate its position based on GNSS satellite signals.

The radio map for the site may be configured to enable estimating a position of the mobile device on the site based on radio signal observation results captured by the radio interface of the mobile device at this position. To this end, the radio map may for example represent at least one of (1) expected radio characteristics of radio signals which are expected to be observable on the site and (2) radio coverage models and expected positions of radio nodes transmitting radio signals which are expected to be observable on the site.

For example, the radio map for the site may be part of a non-GNSS based radio positioning system and the mobile device may be part of a plurality of mobile devices collecting radio fingerprints for updating the radio map for the site (e.g. in the training stage of the non-GNSS based radio positioning system).

To name a few non limiting examples, the mobile device may be one of a smartphone, a tablet computer, a notebook computer, a smart watch, and a smart band.

A radio node may be understood to be a radio device like an access point of a wireless local area network (WLAN) or a Bluetooth beacon. WLAN is for example specified by the standards of the IEEE 802.11 family (http://www.ieee.org/). The Bluetooth standards are specified by the Bluetooth Special Interest Group and are presently available under https://www.bluetooth.com/. Accordingly, radio signals which are expected to be observable on the site may be WLAN and/or Bluetooth signals.

The methods according to the first and second aspects may be understood to serve for updating the radio map for the site, for example in order to improve the quality of the radio map, for example in term of accuracy or completeness, for the site. For example, the accuracy of the radio map (e.g. of a specific version of the radio map) for the site may be determined according to a distance between (1) an estimated position of a mobile device estimated based on the radio map (e.g. the specific version of the radio map) for the site and (2) the real position of the mobile device on the site; and the completeness of the radio map (e.g. of a specific version of the radio map) for the site may be understood to represent the ratio of the number of radio nodes from which radio signals are expected to be observable on the site to the number of radio nodes for which radio models are included in the radio map (e.g. the specific version of the radio map) for the site. It is to be understood that the aspects are not limited to this.

Obtaining data (e.g. radio map data or track data or (a) radio fingerprint(s)) may be understood to mean receiving (e.g. by means of a communication interface) or capturing (e.g. by means of a sensor like a inertial and/or motion sensor or GNSS sensor or a radio interface) or determining (e.g. by means of a processor) the data. Holding available data (e.g. radio map data or track data or (a) radio fingerprint(s)) may be understood to mean storing the data (e.g. in storing means like a memory).

The current radio map and the updated radio map may be understood to be different versions of the radio map for the site (e.g. having different times and/or different dates and/or different radio models and/or different accuracies). In particular, the current radio map may be understood to be an older version of the radio map for the site than the updated radio map. For example, the current radio map may be the newest or up-to-date version of the radio map for the site when the current iteration of the respective method starts; and the updated radio map may be understood to replace the current radio map as newest or up-to-date version of the radio map for the site such that the updated radio map may be the newest or up-to-date version of the radio map for the next iteration of the respective method.

For example, the current radio map data as well as the updated radio map data may be obtained by receiving or storing or determining the respective map data.

The track data may represent or enable estimating the movement of the mobile device along the track on the site. Thereby, the track on the site may be understood to be a movement path of the mobile device on the site.

The track data may be obtained by capturing the sensor data (e.g. by the one or more sensors) and the radio signal observation data (e.g. by the radio interface).

For example, the sensor data are based on or represent measurement results measured by one or more sensors of the mobile device when the mobile device was moving along the track on the site. In particular, the sensor data may represent a sequence (e.g. a chronological sequence) of sets of measurement results measured by one or more sensors of the mobile device at subsequent measurement positions on the track. Thereby, each measurement result of a respective set of measurement results may be measured at the same respective measurement position.

For example, the one or more sensors of the mobile device comprise at least one of the following inertial and/or motion sensors: (1) a gyroscope, (2) a velocity sensor, (3) an accelerometer, (4) a compass, or (5) a barometer. Accordingly, an example of a measurement result measured by these one or more inertial and/or motion sensors is an indication of at least one of (1) an orientation, (2) a velocity, (3) an acceleration, (4) a direction, (5) an atmospheric pressure or (6) an altitude.

The radio signal observation data may represent a sequence (e.g. a chronological sequence) of sets of radio signal observation results captured by the radio interface of the mobile device at subsequent observation positions on the track. Thereby, each set of radio signal observation results may indicate respective radio signal characteristics of radio signals like WLAN- and/or Bluetooth-signals observed by the radio interface of the mobile device at the same observation position when the respective set of radio signal observation results was captured.

For example, the radio interface of the mobile device may repeatedly scan for radio signals like WLAN and/or Bluetooth-signals when the mobile device is moving along the track on the site to capture a sequence of sets of radio signal observation results. In this regard, a specific radio signal may be understood to be observed by the radio interface of the mobile device if the specific radio signal is detected or received by the radio interface when scanning for radio signals.

As disclosed below in more detail, each set of radio signal observation results may include for each observed radio signal at least one of the following radio signal characteristics (1) a respective indication of a received signal strength, (2) a respective indication of a signal-to-noise ratio and (3) a respective identifier of a radio node.

Estimating the observation positions on the track based on the track data and the current radio map data according to the first aspect may be understood to mean that in addition to the radio map data both the sensor data and the radio signal observation data included in the track data are used (e.g. as input data) for estimating the observation positions. Thereby, the observation positions may be estimated by using a sensor fusion method or algorithm like a Particle or Kalman filter or smoother which receives the current radio map data and the track data including the sensor data and the radio signal observation data as input data. It is to be understood that further data (e.g. the below disclosed reference position data) may be additionally considered (e.g. as input data) for estimating the observation positions. By making used of the track data, the observation positions can thus be estimated even if there is not a GNSS satellite signal based position of the mobile device available.

Furthermore, it is to be understood that in at least one further iteration of the method (e.g. in an initial iteration of the method) of the first aspect, if there is not a current radio map available for the site, neither current radio map data nor radio observation data may be used for estimating the observation positions.

As a result of estimating the observation positions on the track, estimated observation positions are obtained (e.g. represented by output data of a sensor fusion method or algorithm). In particular, a sequence (e.g. a chronological sequence) of estimated observation positions may be obtained as a result of estimating the observation positions. It is to be understood that these estimated observation positions may deviate from the (real) observation positions. The estimated observation positions may be two dimensional positions and/or three dimensional positions. Thereby, such a two dimensional position may represent a respective estimated observation position horizontally, for example on earth surface (e.g. by respective geographic coordinates of the respective estimated observation position); and such a three dimensional positions may represent a respective estimated observation position horizontally and vertically, for example on and above earth surface (e.g. by respective geographic coordinates of the respective estimated observation position and an altitude of the respective estimated observation position above sea level).

Subsequently, each of the estimated observation positions is associated with a respective set of radio signal observation results represented by the radio signal observation data to determine the sequence (e.g. chronological sequence) of radio fingerprints according to the first aspect. For example, if the estimated observation positions and the sets of radio signal observation results are available as sequences (e.g. chronological sequences), the sequence of radio fingerprints is determined by associating each estimated observation position with a respective set of radio signal observation results having the same position in the sequence like the respective estimated observation position. As a result of this associating step according to the first aspect, the sequence (e.g. chronological sequence) of radio fingerprints may be obtained.

Using the sequence of radio fingerprints for determining the updated radio map for the site according to the first aspect may be understood to mean that the updated radio map is determined based on the sequence of radio fingerprints according to the first aspect. This would mean that the step of determining the updated radio map is part of the method of the first aspect.

It is however preferred that the step of determining the updated radio map is part of the method of the second aspect. To this end, the sequence of radio fingerprints may be provided according to the first aspect such that it is obtainable according to the second aspect. For example, the sequence of radio fingerprints for determining the updated radio map may be provided, according to the first aspect, by the transmitting it from an apparatus performing the method according to the first aspect (e.g. the mobile device) to an apparatus performing the method according to the second aspect (e.g. a server); and the sequence of radio fingerprints for determining the updated radio map may be obtained, according to the second aspect, by receiving it from an apparatus performing the method according to the first aspect (e.g. the mobile device) by an apparatus performing the method according to the second aspect (e.g. a server).

Accordingly, the sequence of radio fingerprints according to the second aspect and the sequence of radio fingerprints according to the first aspect may be the same. In particular, the sequence of radio fingerprints according to the second aspect may be obtained as a result of the estimating step and the associating step according to the first aspect. Thereby, each radio fingerprint of the sequence of radio fingerprints according to the first and second aspects represents a respective estimated observation position of a mobile device on the track on the site and a respective set of radio signal observation results captured by the radio interface of the mobile device, wherein the respective estimated observation position is/was estimated based on the current radio map data and the track data including the sensor data and the radio signal observation data. For example, the respective estimated observation position of the respective radio fingerprint of the sequence of radio fingerprints may be an estimate of the observation position at which the respective set of radio signal observation results has been captured by the radio interface of the mobile device.

Determining an updated radio map for the site based on the sequence of radio fingerprints may be understood to mean that the sequence of radio fingerprints is considered (e.g. as input data) for determining (e.g. generating) the updated radio map. It is to be understood that further data may be additionally used (e.g. as input data) for determining the updated radio map. The updated radio map may be determined by using an algorithm or method for updating or generating a radio map.

The updated radio map data representing the updated radio obtained as a result of the determining step may be used as current radio map data for the next iteration of the methods according to the first and second aspects. This may be understood to mean that the updated radio map of the (n)-th (e.g. the second) iteration is obtained or hold available as current radio map in the (n+1)-th (e.g. the third) iteration of the methods. To this end, if the step of determining the updated radio map is part of the method of the second aspect, the updated radio map may be provided according to the second aspect. For example, the updated radio map may be provided, according to the second aspect, by the transmitting it from an apparatus performing the method according to the second aspect (e.g. a server) to an apparatus performing the method according to the first aspect (e.g. the mobile device). It is however to be understood that the updated radio map may only be provided if it meets a predefined minimum radio map quality criterion like a minimum accuracy or minimum completeness of the updated radio map.

By using the updated radio map data representing the updated radio map data as current radio map data for the next iteration of the methods according to the first and second aspects, a feedback loop may be created by iteratively performing the methods of the aspects. Since additional (i.e. different) track data and/or radio fingerprints are obtained/determined in each iteration for determining the updated radio map, such a feedback loop has the effect that the quality (e.g. in terms of accuracy and/or completeness) of the updated radio map is expected to improve in each iteration. As disclosed above, the accuracy of the updated radio map may be determined according to a distance (1) between an estimated position of a mobile device estimated based on the updated radio map and (2) the real position of the mobile device on the site; and the completeness of the updated radio map may be understood to represent the ratio of the number of radio nodes from which radio signals are expected to be observable on the site to the number of radio nodes for which radio models are included in the updated radio map.

In addition to the methods according to the first and second aspects, apparatuses, non-transitory computer readable storage mediums and computer program codes according to the first and second aspects are disclosed in the following.

According to the first aspect, an apparatus is disclosed, wherein the apparatus comprises means configured for performing the method according to the first aspect. For example, the apparatus is a mobile device (e.g. the mobile device of the method according to the first aspect) or a module for a mobile device.

According to the second aspect, an apparatus is disclosed, wherein the apparatus comprises means configured for performing the method according to the second aspect. For example, the apparatus is a server or a module for a server or part of a server cloud.

The disclosed apparatuses according to the first and second aspects may comprise a single means for all functions, a common plurality of means for all functions, or a plurality of different means for different functions.

The means of the disclosed apparatuses according to the first and second aspects may be implemented in hardware and/or software. They may comprise a processor for executing computer program code for realizing the required functions, a memory storing the computer program code, or both. Accordingly, the disclosed apparatuses according to the first and second aspects may comprise at least one processor and at least one memory containing computer program code, the at least one memory and the computer program code with the at least one processor configured to cause the respective apparatus at least to perform the respective method.

Alternatively or additionally, the means of the disclosed apparatuses according to the first and second aspects may comprise circuitry that is designed to realize the required functions, for example implemented in a chipset or a chip, like an integrated circuit.

According to the first aspect, a computer program code is disclosed, wherein the computer program code when executed by a processor causes an apparatus to perform the method according to the first aspect; and, according to the second aspect, a computer program code is disclosed, wherein the computer program code when executed by a processor causes an apparatus to perform the method according to second aspect.

According to the first aspect, a non-transitory computer readable storage medium is disclosed, in which computer program code is stored, wherein the computer program code causes an apparatus to perform the method according to the first aspect when executed by a processor; and, according to the second aspect, a non-transitory computer readable storage medium is disclosed, in which computer program code is stored, wherein the computer program code causes an apparatus to perform the method according to the second aspect when executed by a processor. The respective computer program code could be stored in the respective computer readable storage medium in the form of instructions encoding the respective computer-readable storage medium.

The computer readable storage medium according to the first and second aspects may be intended for taking part in the operation of a device (e.g. a mobile device or a server), like an internal or external hard disk of a computer, or be intended for distribution of the computer program code, like an optical disc.

According to a third aspect, a system is disclosed, wherein the system comprises one or more servers and one or more mobile devices, wherein the one or more servers and the one or more mobile devices are configured to cooperate for performing the method according to first aspect and the method according to the second aspect. This may be understood to mean that the one or more mobile devices are configured for performing some steps of the method according to first aspect and the method according to the second aspect and that the one or more servers are configured for performing the other steps of the method according to first aspect and the method according to the second aspect. For example, the one or more mobile device are apparatuses according to the first aspect, and the one or more servers are apparatuses according to the second aspect.

The system according to the third aspect may be or may be part of a non-GNSS satellite signal based radio positioning system.

In the following, further exemplary embodiments of the aspects of the invention will be described.

According to an exemplary embodiment of the aspects, the current and/or updated radio map for the site includes one or more radio models for at least one of (1) one or more grid points of at least one grid system or (2) one or more radio models for one or more radio nodes.

The grid system may be a predefined grid system for the radio map for the site like a two or three dimensional grid (e.g. a square or cube grid). Each grid point of the grid system may correspond to a respective position on the site. A respective radio model for a respective grid point of the grid system may represent an expected radio signal characteristic for the position on the site corresponding to the respective grid point like an indication of radio signals which are expected to be observable at this position on the site and/or an indication of received signal strengths of radio signals which are expected to be observable at this position on the site and/or an indication of variation of received signal strengths of radio signals which are expected to be observable at this position on the site. It is to be understood that there may be more than one grid system, for example different grid systems may be included in the radio map for indoor and outdoor sections of the site.

The one or more radio nodes may be part of a plurality of radio nodes from each of which radio signals are expected to be observable on the site. A respective radio model for a respective radio node of the plurality of radio nodes may represent an expected radio signal characteristic for the radio node like a radio coverage model of the respective radio node and/or an estimated position of the respective radio node. Thereby, the radio coverage model may describe the expected radio coverage of the respective radio node on the site.

For example, the radio coverage models of the current and/or updated radio map for the site may be geometric radio models. Such a geometric radio model for a radio node may (e.g. geometrically) describe an expected radio coverage of a radio node on the site. Thereby, one or more radio signals transmitted by the radio node are expected to be observable within the expected radio coverage (e.g. geometrically) described by the geometric radio model for a radio node may. For example, a geometric radio model may have one of the following geometric shapes:

a polygon;
a rectangle and/or a square;
a cuboid and/or a cube;
an ellipse and/or a circle; or
an ellipsoid and/or a sphere.

Using such geometric radio models has the effect that the radio coverage model is very simple, only requires a small amount of data and is easy to analyze. It is however to be understood that the scope of the present invention is not limited to geometric radio models. For example, a parametric radio model like a path-loss model may be applied as well within the scope of the present invention.

According to an exemplary embodiment of the aspects, determining the updated radio map comprises at least one of:

associating each radio fingerprint of the sequence of radio fingerprints with at least one of (1) a respective grid point of at least one grid system or (2) a respective radio node;

determining a respective radio model for at least one of (1) a respective grid point of the grid system or (2) a respective radio node based on radio fingerprints associated with the respective grid point or the respective radio node;

determining a respective radio model for at least one of (1) a respective grid point of the grid system or (2) a respective radio node based on radio fingerprints associated with the respective grid point or the respective radio node if the respective radio model meets at least one predefined radio model quality criterion;

including a respective radio model for at least one of (1) a respective grid point of the grid system or (2) a respective radio node in the updated radio map; or including a respective radio model for at least one of (1) a respective grid point of the grid system or (2) a respective radio node in the updated radio map if the respective radio model meets at least one predefined radio model quality criterion.

As disclosed above, the current and/or updated radio map for the site includes one or more radio models for at least one of (1) one or more grid points of a grid system or (2) one or more radio models for one or more radio nodes.

For example, associating each radio fingerprint of the sequence of radio fingerprints with a respective grid point of the grid system may be understood to mean that each radio fingerprint of the sequence of radio fingerprints is associated with at least one respective grid point of the grid system which corresponds to a position on the site being nearest to the respective estimated observation position represented by the respective radio fingerprint.

Moreover, associating each radio fingerprint of the sequence of radio fingerprints with a respective radio node may be understood to mean that each radio fingerprint of the sequence of radio fingerprints may be associated with at least one respective radio node transmitting a radio signal which was observed when the respective set of radio observation to results represented by the respective radio fingerprint was captured by the radio interface of the mobile device.

By associating each radio fingerprint of the sequence of radio fingerprints with at least one of (1) a respective grid point of a grid system or (2) a respective radio node, the sequence of radio fingerprints is split such that they can be stored and further processed independently from each other, for example to determine radio models for associated grid points and/or radio nodes as disclosed below in more detail. Since the sequence of radio fingerprints is split, it is furthermore prevented that such sequences are used for tracking or identifying the users of the mobile device which is beneficial for data privacy.

Each radio node which is associated with at least one radio fingerprint representing an estimated observation position on the site (e.g. at least one radio fingerprint of the sequence of radio fingerprints) may be understood to be a respective radio node from which radio signals are expected to be observable on the site. Such radio nodes may form or may be part of the plurality of radio nodes from each of which radio signals are expected to be observable on the site.

A respective radio model for at least one of (1) a respective grid point of the grid system or (2) a respective radio node (e.g. of the plurality of radio nodes from each of which radio signals are expected to be observable on the site) based on radio fingerprints associated with the respective grid point or the respective radio node may be determined by determining an expected radio signal characteristics for the respective grid point or of the respective radio node based on sets of radio signal observation results of radio fingerprints associated with the respective grid point or the respective radio node. Accordingly, if a radio fingerprint is associated with a respective grid point of the grid system or a respective radio node, it is to be understood to be associated with the radio model of the respective grid point of the grid system or the respective node.

Examples for radio signal characteristics are an indication of the radio signals which are expected to be observable at the respective grid point and/or an indication of received signal strengths of radio signals which are expected to be observable at the respective grid point based on sets of radio signal observation results of radio fingerprints associated with the respective grid point and/or an estimated position of the respective radio node and/or a radio coverage model of the respective radio node.

Accordingly, determining a respective radio model for at least one of a respective grid point of the grid system or a respective radio node (e.g. of the plurality of radio nodes from each of which radio signals are expected to be observable on the site) may comprise at least one of:
- estimating a position of the respective radio node based on sets of radio signal observation results of radio fingerprints associated with the respective radio node;
- determining a radio coverage model for the respective radio node based on sets of radio signal observation results of radio fingerprints associated with the respective radio node;
- determining an indication of radio nodes transmitting radio signals which are expected to be observable at the respective grid point based on sets of radio signal observation results of radio fingerprints associated with the respective grid point;
- determining an indication of received signal strengths of radio nodes transmitting radio signals which are expected to be observable at the respective grid point based on sets of radio signal observation results of radio fingerprints associated with the respective grid point; or
- determining an indication of variation of received signal strengths of radio nodes transmitting radio signals which are expected to be observable at the respective grid point based on sets of radio signal observation results of radio fingerprints associated with the respective grid point.

A position of the respective radio node may be estimated as a weighted average of estimated observation positions represented by the radio fingerprints associated with the radio node. For the weighted average, a weight of a respective estimated observation position represented by a respective radio fingerprints associated with the radio node may for example be determined to be proportional to a received signal strength that is indicated, with the identifier of the radio node, in the respective set of radio signal observation results represented by the respective radio fingerprint. It is to be understood that there may be different estimated positions for the respective radio node, for example different estimated positions may be obtained in different iterations of the respective method (e.g. due to different radio fingerprints associated with the respective radio node).

As disclosed above, the radio coverage model for the respective radio node may be a geometric radio model. A geometric radio model for the respective radio node may for example be determined as geometric shape of the geometric radio model such that it encompasses at least an estimated position of the respective radio node and a predefined percentage (e.g. 90% or 95% or 100%) of estimated observation positions represented by the radio fingerprints associated with the radio node. Moreover, only estimated observation positions represented by the radio fingerprints associated with the radio node which indicate, with the identifier of the radio node, a received signal strength and/or a respective signal-to-noise ratio in the respective set of radio signal observation results which is greater than a predefined received signal strength threshold and/or a predefined signal-to-noise ratio may be used for determining the geometric radio model. It is to be understood that there may be different radio coverage models for the respective radio node, for example different radio coverage models may be obtained in different iterations of the respective method (e.g. due to different radio fingerprints associated with the respective radio node).

An indication of radio nodes transmitting radio signals which are expected to be observable at the respective grid point may be determined as indication (e.g. in the form of a list) of the identifiers of radio nodes indicated in the sets of radio signal observation results represented by the radio fingerprints associated with the respective grid point.

An indication of received signal strengths of radio nodes transmitting radio signals which are expected to be observable at the respective grid point may be determined as average received signal strengths of radio nodes. For each radio node, the average receive signal strength may for example be determined based on the received signal strengths indicated, with the identifier of the respective radio node, in the sets of radio signal observations represented by the radio fingerprints associated with the respective grid point.

An indication of variations of received signal strengths of radio nodes transmitting radio signals which are expected to be observable at the respective grid point may be determined by determining, for each radio node, the respective variance of received signal strength based on the received signal strengths indicated, with the identifier of the respective radio node, in the sets of radio signal observations represented by the radio fingerprints associated with the respective grid point.

Including a respective radio model for at least one of (1) a respective grid point of the grid system or (2) a respective radio node (e.g. of the plurality of radio nodes from each of which radio signals are expected to be observable on the site) in the updated radio map may be understood to mean that the respective radio model is added to the current radio map to determine the updated radio map.

Preferably, the respective radio model is only determined and/or included in the updated radio map if it meets at least one predefined radio model quality criterion. For example, the predefined radio model quality criterion is at least one of:
(1) more than a predefined number of radio fingerprints is associated with the respective radio model;
(2) more than a predefined number of radio fingerprints representing a respective estimated observation position within a predefined distance from each other is associated with the respective radio model;
(3) more than a predefined number of radio fingerprints representing a respective set of radio signal observation results including an indication of a received signal strength which is greater than a predefined received signal strength threshold is associated with the respective radio model.
(4) more than a predefined number of radio fingerprints representing both:
  a respective set of radio signal observation results including an indication of a received signal strength which is greater than a predefined received signal strength threshold and
  a respective estimated observation position within a predefined distance from each other is associated with the respective radio model;
(5) less than a predefined number or proportion of radio fingerprints associated with the respective radio model is determined to be a potential outlier; or
(6) radio fingerprints associated with the respective radio model originate from more than a predefined number of sequences of radio fingerprints for different tracks.

The predefined radio model quality criterion may be selected such that it is expected that radio models meeting the radio model quality criterion meet a desired accuracy.

As disclosed above, if a radio fingerprint is associated with a respective grid point of the grid system or a respective radio node, it is to be understood to be associated with the radio model of the respective grid point of the grid system or the respective node.

For example, it is expected that the accuracy of the respective radio model improves when the number of radio fingerprints used for determining the radio model increases because it is expected that the effect of potential outliers is minimized when the number of radio fingerprints is increased. Accordingly, the predefined number of radio fingerprints according to radio model quality criterion (1) may be selected such that it is expected that the respective radio model meets or exceeds a desired accuracy.

In addition to criterion (1), radio model quality criterion (2), radio model quality criterion (3) and radio model quality criterion (4) only use specific radio fingerprints for determining whether more than a predefined number of radio fingerprints is associated with the respective radio model. This may have the effect that (most) potential outliers are excluded from determining whether more than a predefined number of radio fingerprints is associated with the respective radio model. For example, the predefined distance according to radio model quality criteria (2) and (4) may be selected such that it is expected that (most) potential outliers do not meet this criteria. For example, predefined distance is or corresponds to a predefined distance around an estimated position of the respective radio node of the respective radio model. Similarly, the predefined received signal strength threshold according to radio model quality criteria (3) and (4) may be selected such that it is expected that (most) potential outliers do not meet this criteria.

By limiting the number or proportion (e.g. 2% or 5% or 10%) of radio fingerprints determined to be a potential outlier according to radio model quality criterion (5), the effect of potential outliers may be minimized as well. Thereby, a potential outlier may for example be determined to be a radio fingerprint associated with a respective radio model and representing a respective set of radio signal observation results including an indication of a received signal strength which is less than a predefined received signal strength threshold and/or a respective estimated observation position outside a predefined distance from an estimated position of the respective radio node of the respective radio model.

The effect of radio model quality criterion (6) may be that the effect of erroneous radio observation data captured by a radio interface of a single mobile device or on a single track (e.g. due to distortion) can be minimized.

It is to be understood that the respective radio model may only be included in the updated radio map if it meets a predefined combination of any of radio model quality criteria (1) to (6).

According to an exemplary embodiment of the aspects, only radio fingerprints of the sequence of radio fingerprints meeting at least one predefined radio fingerprint quality criterion are/were used for determining the updated radio map. The predefined radio fingerprint quality criterion may be selected such that it is expected that, if the updated radio map or a respective radio model is determined only based on radio fingerprints meeting the predefined radio fingerprint quality criterion, the updated radio map or the respective radio model meets a desired accuracy.

For example, the predefined radio fingerprint quality criterion for each radio fingerprint of the sequence of radio fingerprints is at least one of:
(1) respective accuracy of respective estimated observation position represented by respective radio fingerprint is determined to be less than a predefined accuracy threshold;
(2) respective estimated observation position represented by respective radio fingerprint is a three dimensional position;
(3) respective signal quality of set of radio signal observation results is determined to be greater than predefined signal quality threshold.

The respective accuracy of respective estimated observation position represented by the respective radio fingerprint may be determined to be less than the predefined accuracy threshold according to radio fingerprint quality criterion (1) if the deviation between the respective estimated observation position and the real observation position is expected to be less than the predefined accuracy threshold (e.g. 1 m or 0.5 m).

As disclosed above, a three dimensional position may represent a respective estimated observation position horizontally and vertically, for example on and above earth surface (e.g. by respective geographic coordinates of the respective estimated observation position and an altitude of the respective estimated observation position above sea level). Radio fingerprint quality criterion (2) may for example be advantageous if the updated radio map is a three dimensional map which enables horizontal as well as vertical positioning.

Examples for a predefined signal quality threshold according to radio fingerprint quality criterion (3) are a predefined received signal strength threshold (e.g. −65 dBm . . . ) or a predefined signal-to-noise ratio threshold (e.g. 1/10). To determine whether radio fingerprint quality criterion (3) is met, it may for example be determined whether an average received signal strength of received signal strengths indicated by the respective set of radio signal observation results is greater than the predefined received signal strength threshold and/or whether an average signal-to-noise ratio of signal-to-noise ratios indicated by the respective set of radio signal observation results is greater than the predefined signal-to-noise ratio threshold.

It is to be understood that only radio fingerprints of the sequence of radio fingerprints meeting a predefined combination of any of radio fingerprint quality criteria (1) to (3) are/were used for determining the updated radio map.

According to an exemplary embodiment of the aspects, only radio signal observation results represented by the radio signal observation data included in the track data meeting at least one predefined radio signal observation result quality criterion are/were used for estimating the estimated observation positions. The predefined radio signal observation result quality criterion may be selected such that it is expected that, if a respective estimated observation position is estimated only based on radio signal observation results meeting the predefined radio signal observation result quality criterion, the respective estimated observation position meets a desired accuracy.

For example, the predefined radio signal observation result quality criterion for each radio signal observation result represented by radio signal observation data included in the track data is at least one of:
(1) respective signal quality of respective radio signal observation result is determined to be greater than predefined signal quality threshold; or
(2) respective signal quality of respective radio signal observation result is greatest signal quality of all radio signal observation results represented by radio signal observation data included in the track data for a respective radio node.

As disclosed above, examples of a predefined signal quality threshold according to radio signal observation result quality criteria (1) and (2) is a predefined received signal strength threshold (e.g. −65 dBm) or a predefined signal-to-noise ratio threshold (e.g. 1/10).

To determine whether radio signal observation result quality criterion (1) is met, it may for example be determined whether a received signal strength indicated by the respective radio signal observation result is greater than the predefined received signal strength threshold and/or whether a signal-to-noise ratio indicated by the respective radio signal observation result is greater than the predefined signal-to-noise ratio threshold.

The radio signal observation result may be understood to be for the respective radio node if it indicates an identifier of the respective radio node. To determine which radio signal observation result meets radio signal observation result quality criterion (2), the respective radio signal observation result indicating the greatest received signal strength and/or the greatest signal-to-noise ratio is selected from selected from all radio signal observation results represented by the radio signal observation data included in the track data which indicate the identifier of the respective radio node.

For example, radio signal observation result quality criterion (2) may be applied if radio signal observation result quality criterion (1) is not met by any radio signal observation result for a respective radio node.

According to an exemplary embodiment of the aspects, the updated radio map includes at least one of:
more radio models for grid points or radio nodes than the current radio map; or
at least one updated radio model for at least one of a respective grid point or a respective radio node that has been determined based on at least one radio fingerprint of the sequence of radio fingerprints associated with the respective grid point or the respective radio node.

According to an exemplary embodiment of the aspects, the respective method is at least repeated until at least one of:
a respective radio model for a predefined number or portion of radio nodes (e.g. each radio node) from which radio signals are expected to be observable on the site is included in the updated radio map of the current iteration;
a predefined number of iterations is completed;
the updated radio map of the current iteration meets a predefined radio map quality criterion.

As disclosed above, each radio node which is associated with at least one radio fingerprint representing an estimated observation position on the site (e.g. at least one radio fingerprint of the sequence of radio fingerprints) may be understood to be a respective radio node from which radio signals are expected to be observable on the site. The predefined number or proportion (e.g. 80%, 90% or 95%) of radio nodes may be selected such that, if a radio model for a predefined number or portion of radio nodes (e.g. each radio node) from which radio signals are expected to be observable on the site is included in the updated radio map of the current iteration (i.e. the updated radio map determined in the current iteration and/or based on the sequence of radio fingerprints of the current iteration), the updated radio map of this current iteration may be assumed to be complete. Based on this assumption, it may be predetermined to stop repeating the respective method if it is determined that, for each radio node from which radio signals are expected to be observable on the site, a respective radio model is included in the updated radio map of the current iteration.

If a predefined number of iterations is completed, it may be assumed that it is not possible to further improve the updated radio map of the current iteration (i.e. the updated radio map determined in the current iteration and/or based on the sequence of radio fingerprints of the current). Based on this assumption, it may be predetermined to stop repeating the respective method if it is determined that a predefined number of iterations is completed.

Alternatively or additionally, it may be predetermined to stop repeating the respective method if it is determined that the updated radio map of the current iteration (i.e. the updated radio map determined in the current iteration and/or based on the sequence of radio fingerprints of the current iteration) meets a predefined radio map quality criterion. Examples of such a predefined radio map quality criterion may be a desired accuracy or completeness of the updated radio map of the current iteration. As disclosed above, the accuracy of the updated radio map may be determined according to a distance between (1) an estimated position of a mobile device estimated based on the updated radio map and (2) the real position of the mobile device on the site; and the completeness of the updated radio map may be understood to represent the ratio of the number of radio nodes from which radio signals are expected to be observable on the site to the number of radio nodes for which radio models are included in the updated radio map.

As disclosed above, repeating the methods of the aspects has the effect that the quality (e.g. in terms of accuracy and/or completeness) of the updated radio map improves in each iteration. Repeating the methods of the aspect until at least one of these criteria is met thus means that it is expected that the quality (e.g. in terms of accuracy and/or completeness) of the updated radio map improves until a desired or possible quality of the updated radio map is achieved.

According to an exemplary embodiment of the aspects, the updated radio map of the current iteration (i.e. the updated radio map determined in the current iteration and/or based on the sequence of radio fingerprints of the current iteration) is obtained or hold available as current radio map in at least one further iteration of the method. This may be understood to mean that the updated radio map of the (n)-th (e.g. the second) iteration is obtained or hold available as current radio map in the (n+1)-th (e.g. the third) iteration of the method such that a feedback loop is created which has the effect as disclosed above that it is expected that the quality (e.g. in terms of accuracy and/or completeness) of the updated radio map improves in each iteration.

It is to be understood that the updated radio map of the current iteration (i.e. the updated radio map determined in the current iteration and/or based on the sequence of radio fingerprints of the current iteration) may only be obtained or hold available as current radio map in at least one further iteration of the method if it meets a predefined minimum radio map quality criterion like a minimum accuracy or minimum completeness of the updated radio map of the current iteration. As disclosed above, the accuracy of the updated radio map may be determined according to a distance between (1) an estimated position of a mobile device estimated based on the updated radio map and (2) the real position of the mobile device on the site; and the completeness of the updated radio map may be understood to represent the ratio of the number of radio nodes from which radio signals are expected to be observable on the site to the number of radio nodes for which radio models are included in the updated radio map.

To this end and as disclosed above, if the step of determining the updated radio map is part of the method of the second aspect, the updated radio map may be provided according to the second aspect. For example, the updated radio map may be provided, according to the second aspect, by the transmitting it from an apparatus performing the method according to the second aspect (e.g. a server) to an apparatus performing the method according to the first aspect (e.g. the mobile device).

According to an exemplary embodiment of the aspects, the track data further include reference position data representing or enabling determining at least one reference position of the mobile device when moving along the track. For example, the reference position is at least one of a satellite signal based position or a cellular signal based position.

An example of a satellite signal based position is a position determined based on satellite signals of a global navigation satellite system (GNSS) like GPS (Global Positioning System) or Galileo. Accordingly, such a satellite signal based position may be determined by a GNSS sensor of the mobile device.

An example of a cellular signal based position may be a cell identifier like a Cell ID (CID) or UTRAN Cell ID (LCID) in a cellular communication network like a 2G/3G/4G/5G cellular communication network. Such a Cell ID may be considered to be indicative of the coarse position of the mobile device when a cellular radio signal representing the respective Cell ID is/was received, because it indicates that the (e.g. absolute) position of the mobile device is/was in the coverage area of the network node of the cellular communication network transmitting the cellular radio signal containing the respective Cell ID.

This is particularly advantageous if there is not a current radio map for the site available to determine a coarse (e.g. absolute) position where the track data are/were captured.

Accordingly, in at least one further iteration of the method (e.g. in an initial iteration of the method if there is not a current radio map for the site available) of the first aspect only sensor data and/or reference position data included in the track data may be used for estimating the observation positions.

According to an exemplary embodiment of the aspects, each set of radio signal observation results includes for each observed radio signal at least one of:
  a respective indication of a received signal strength;
  a respective indication of a signal-to-noise ratio;
  a respective identifier of a radio node.

As disclosed above, each set of radio signal observation results may indicate respective radio signal characteristics of radio signals like WLAN- and/or Bluetooth-signals observed by the radio interface of the mobile device at the same observation position when the respective set of radio signal observation results was captured. Examples for such radio signal characteristics are a respective indication of a received signal strength, a respective indication of a signal-to-noise ratio and a respective identifier of a radio node.

An indication of a received signal strength may represent the receiving power of an observed radio signal. In other words, the indication of a received signal strength may represent the receiving power of a radio signal observed by the mobile device when scanning for radio signals. For example, the radio interface of the mobile device may measure the receiving power of a radio signal observed by the mobile device when scanning for radio signals. An example, of an indication of a received signal strength is a received signal strength indicator (RSSI) or a physical receiving power level (e.g. a Rx power level) in dBm.

An indication of a signal-to-noise ratio may represent a ratio of the receiving power of an observed radio signal and the receiving power of observed background noise. For example, when scanning for radio signals, the mobile device may measure the receiving power of a radio signal observed by the mobile device and the receiving power of the background noise observed by the mobile device. An example, of an indication of a signal-to-noise ratio is a value representing the ratio of the receiving power of an observed radio signal and the receiving power of observed background noise in dB.

An identifier of a radio node may be understood to mean information contained in an observable radio signal which is configured to enable identifying the radio node transmitting the radio signal and/or distinguishing the radio signals transmitted by the radio node from other radio signals. Examples for such an identifier of a radio node are a name, an address (e.g. a MAC address or an IP address), an universally unique identifier (UUID), a service set identifier (SSID), a basic service set identifier (BSSID), or a combination thereof. For example, the identifiers of such a radio node may be obtained by extracting the identifier from the observed radio signal.

According to an exemplary embodiment of the aspects, the one or more sensors of the mobile device comprise at least one of the following inertial and/or motion sensors:
  a gyroscope,
  a velocity sensor,
  an accelerometer,
  a compass, or
  a barometer.

An accelerometer of the mobile device may be suited to detect an acceleration in a certain direction. A velocity sensor of the mobile device may be suited to detect a speed in a certain direction. A gyroscope may be suited to detect a rotation of the mobile device. Data provided by a compass of the mobile device may be suited to align the captured acceleration or speed to a coordinate system (e.g. a geographic coordinate system). Data provided by a barometer may enable determining an altitude (e.g. above sea level) of the mobile device.

According to an exemplary embodiment of the aspects, the sensor data are or comprise inertial and/or motion sensor data captured by one or more inertial and/or motion sensors. Such inertial and/or motion sensor data may for example represent a sequence (e.g. a chronological sequence) of inertial and/or motion sensor captures which represent the movement of the mobile device when moving along the track like a sequence of accelerations and directions detected by an accelerometer of the mobile device and/or a sequence of altitudes of the mobile device determined based on data provided by a barometer of the mobile device.

According to an exemplary embodiment of the aspects, the estimated observation positions of the mobile device are estimated by using a sensor fusion method or algorithm, in particular a Particle or Kalman filter or smoother.

It is to be understood that the disclosure in this section is merely by way of examples and non-limiting.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

DETAILED DESCRIPTION

The following description serves to deepen the understanding of the present disclosure and shall be understood to complement and be read together with the description as provided in the above SUMMARY section of this specification.

Figure 1:
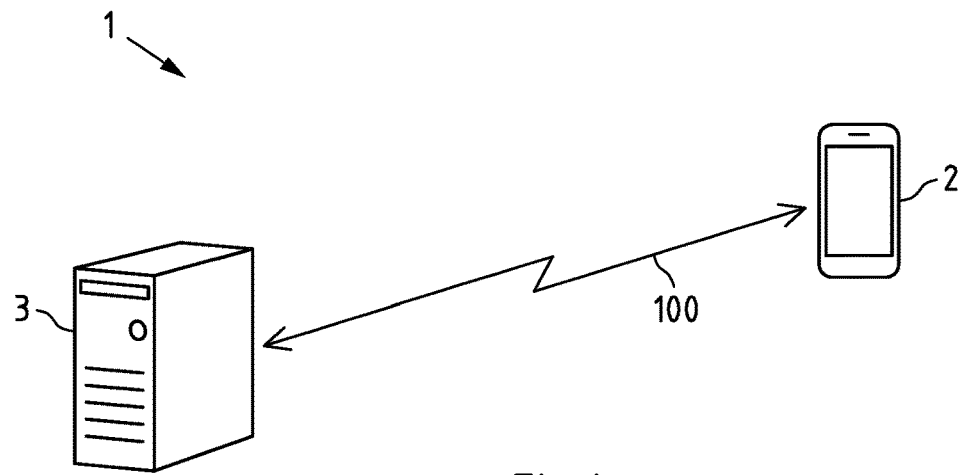
FIG. 1 is a block diagram of an exemplary embodiment of a system according to the third aspect.

FIG. 1 is a schematic high-level block diagram of an exemplary embodiment of a system 1 according to the third aspect. For exemplary purposes and without limiting the scope of the present disclosure, it is assumed in the following that system 1 is or is part of a non-GNSS satellite signal based radio positioning system for a site).

The site is for example a predetermined indoor and/or urban environment like inside and/or outside of a building or a complex of buildings (e.g. a shopping center, a parking garage, a train station, a bus station, an airport, a company site, etc).

System 1 comprises a mobile device 2 and a server 3. Mobile device 2 and server 3 may communicate with each other via communication path 100. Communication path 100 may be a direct or indirect communication path. For example, communication path 100 may comprise one or more hops, for example one or more communication links or communication connections. In the following, it is assumed that communication path 100 is a radio communication connection in a cellular network like a 2G/3G/4G/5G cellular communication network. The 2G/3G/4G/5G cellular radio communication standards are developed by the 3GPP and presently available under http://www.3gpp.org/. It is however to be understood that the invention is not limited to this.

For example, mobile device 2 may be one of a smartphone, a tablet computer, a notebook computer, a smart watch, and a smart band. Mobile device 2 may support the non-GNSS satellite signal based radio positioning system. This may be understood to mean that mobile device 2 is configured to estimate its position on the site at least partially based on radio signals observed by mobile device 2 on the site and a current radio map for the site provided (e.g. transmitted) by server 3 via communication path 100. As disclosed below in more detail, mobile device 2 is moreover configured to provide (e.g. transmit) a sequence of radio fingerprints to server 3 via communication path 100 for determining an updated radio map for the site. Mobile device 2 may be part of a plurality of mobile devices which are configured correspondingly and which collect radio fingerprints in the training stage of the non-GNSS satellite signal based radio positioning system for the site.

Generally, the radio map for the site may be configured to enable mobile device 2 to estimate its position on the site based on radio signal observation results captured by a radio interface of mobile device 2 at this position. To this end, the radio map for the site may for example represent geometric radio models and expected positions of radio nodes transmitting radio signals which are expected to be observable on the site.

It is to be understood that system 1 is not limited to a single server 3, but may optionally comprise a plurality of servers (e.g. forming a server cloud). Accordingly, server 3 may be part of such a plurality of servers (e.g. a server cloud). In particular, server 3 may be a positioning server of the non-GNSS satellite signal based radio positioning system which is configured to provide (e.g. transmit) current radio map data representing a current radio map for the site to mobile device 2. As disclosed below in more detail, server 3 is moreover configured to obtain (e.g. receive and store) a sequence of radio fingerprints from mobile device 2 via communication path 100 for determining an updated radio map for the site.

The current radio map and the updated radio map may be understood to be different versions of the radio map for the site (e.g. having different times and/or different dates and/or different radio models and/or different accuracies).

Figure 2:
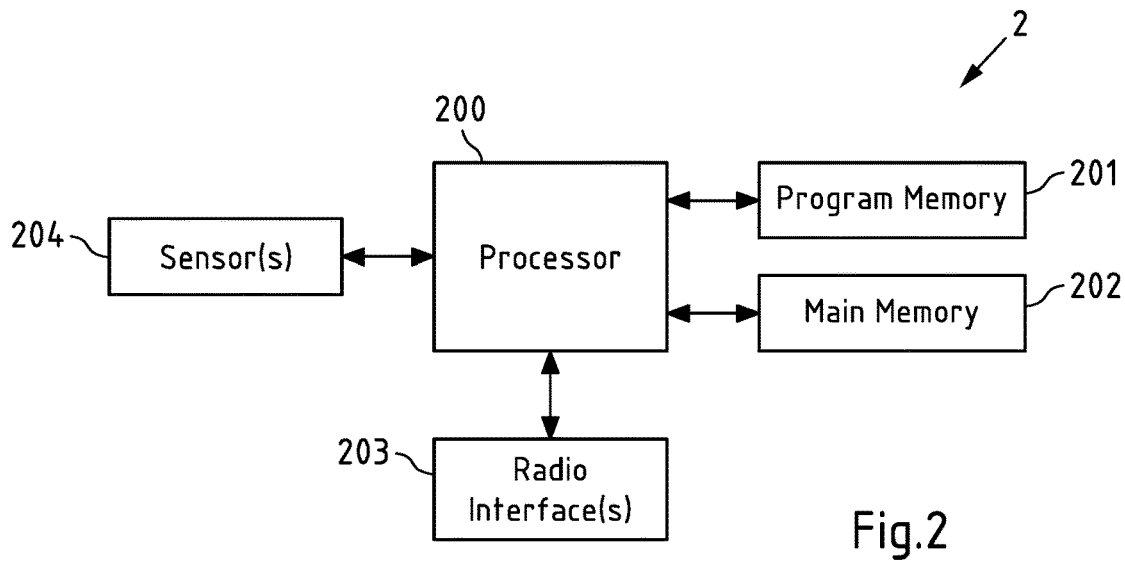
FIG. 2 is a block diagram of an exemplary embodiment of a mobile device according to the first aspect.

FIG. 2 is a block diagram of an exemplary embodiment of mobile device 2 according to the first aspect. In the following, it is assumed that mobile device 2 of FIG. 1 corresponds to this mobile device 2.

Mobile device 2 comprises a processor 200. Processor 200 may represent a single processor or two or more processors, which are for example at least partially coupled, for example via a bus. Processor 200 executes a computer program code stored in program memory 201 (e.g. computer program code causing mobile device 2 to perform any one embodiment of the method of the first aspect like the method described below with reference to FIG. 4 when executed on processor 200), and interfaces with a main memory 202. Program memory 201 may also contain an operating system for processor 200 and further data like track data and radio map data. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls radio interface(s) 203. In the following, it is assumed that radio interface(s) 203 comprise a 2G/3G/4G/5G radio transceiver and a WLAN- and/or Bluetooth radio transceiver. It is however to be understood that the invention is not limited to this.

The 2G/3G/4G/5G radio transceiver of radio interface(s) 203 is configured and/or used for communicating via a cellular network, for example for transmitting and receiving data via communication path 100 of system. Accordingly, mobile device 2 may use the 2G/3G/4G/5G radio transceiver of radio interface(s) 203 to communicate with server 3 of system 1.

The WLAN- and/or Bluetooth radio transceiver of radio interface(s) 203 is configured and/or used for capturing radio signal observation data. To this end, the WLAN- and/or Bluetooth radio transceiver may be configured or used for repeatedly scanning for WLAN and/or Bluetooth radio signals and for determining radio signal characteristics of observed WLAN and/or Bluetooth radio signals. A respective WLAN and/or Bluetooth radio signal may be understood to be observable if the respective WLAN and/or Bluetooth radio signal is receivable with a minimum quality (e.g. a minimum signal-to-noise ratio and/or a minimum signal power) by the WLAN- and/or Bluetooth radio transceiver of radio interface(s) 203.

Examples for radio signal characteristics of observed radio signals are an indication of a received signal strength of the observed radio signal and an identifier of a radio node transmitting the observed radio signal.

In order to determine an indication of a received signal strength, the WLAN- and/or Bluetooth radio transceiver of radio interface(s) 203 may measure a receiving power of a radio signal observed by the mobile device when scanning for radio signals. An example for an indication of a received signal strength is a received signal strength indicator (RSSI) or a physical receiving power level (e.g. a Rx power level) in dBm.

Moreover, the WLAN- and/or Bluetooth radio transceiver of radio interface(s) 203 may extract the identifier from an observed radio signal to determine an identifier of a radio node transmitting the radio signal. Examples for such an identifier of a radio node are a name, an address (e.g. a MAC address or an IP address), a universally unique identifier (UUID), a service set identifier (SSID), a basic service set identifier (BSSID), or a combination thereof.

Without limiting the scope of the present disclosure, it is assumed in the following that the radio observation result data captured by the WLAN- and/or Bluetooth radio transceiver of radio interface(s) 203 represent a chronological sequence of sets of radio signal observation results, wherein each set of radio signal observation results includes a respective indication of a received signal strength and a respective identifier of a radio node for each WLAN and/or Bluetooth radio signals observed by the WLAN- and/or Bluetooth radio transceiver of radio interface(s) 203 at the same observation position (i.e. the position where the mobile device 2 is/was located when the respective set of radio signal observation results is/was captured).

It is to be understood that any computer program code required for receiving and processing observed radio signals may be stored in an own memory of radio interface(s) 203 and executed by an own processor of radio interface(s) 203 or it may be stored for example in program memory 201 and executed for example by processor 200.

Moreover, processor 200 controls sensor(s) 204 configured for capturing inertial and/or motion sensor data and reference position data.

In the following it is assumed that sensor(s) 204 comprise a GNSS sensor which is configured or used for capturing reference position data representing or enabling determining at least one reference position of mobile device 2 in form of a GNSS satellite signal based position.

Moreover, it is assumed in the following that the inertial and/or motion sensor data may represent a chronological sequence of inertial and/or motion sensor captures which represent the movement of mobile device 2 when moving along a track like a sequence of accelerations and directions detected by an accelerometer and/or a sequence of altitudes of the mobile device determined based on data provided by a barometer. Accordingly, sensor(s) 204 may for example comprise one or more inertial and/or motion sensors like an accelerometer and/or a barometer. Further examples for inertial and/or motion sensors are a gyroscope, a velocity sensor and a compass.

It is to be understood that any computer program code required for processing sensor captures to determine inertial and/or motion sensor data and reference position data may be stored in an own memory of sensor(s) 204 and executed by an own processor of sensor(s) 204 or it may be stored for example in program memory 201 and executed for example by processor 200.

The components 201 to 204 of mobile device 2 may for instance be connected with processor 200 by means of one or more serial and/or parallel busses.

It is to be understood that mobile device 2 may comprise various other components like a user interface for receiving user input.

Figure 3:
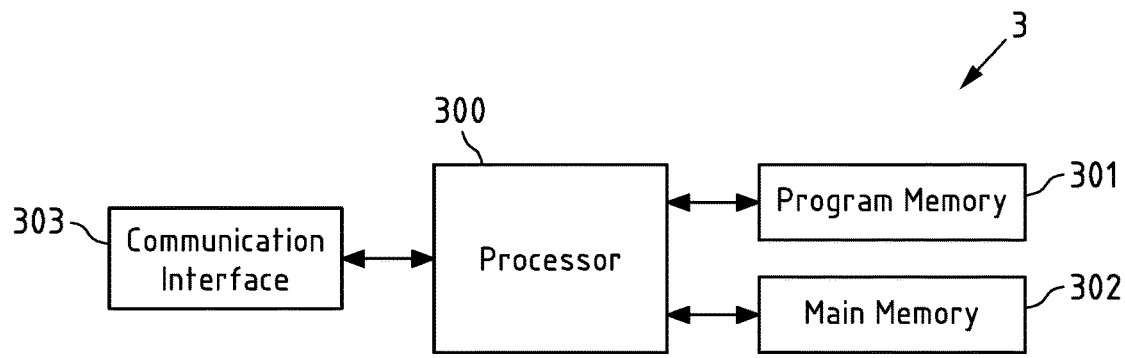
FIG. 3 is a block diagram of an exemplary embodiment of a server according to the second aspect.

FIG. 3 is a block diagram of an exemplary embodiment of server 3 according to the second aspect. In the following, it is assumed that server 3 of system 1 of FIG. 1 corresponds to this server 3.

Server 3 comprises a processor 300. Processor 300 may represent a single processor or two or more processors, which are for instance at least partially coupled, for instance via a bus. Processor 300 executes a computer program code (e.g. computer program code causing server 3 to perform any one embodiment of the method of the second aspect like the method described below with reference to FIG. 5 when executed on processor 300) stored in program memory 301, and interfaces with a main memory 302. Program memory 301 may also contain an operating system for processor 300. Moreover, program memory 301 may contain further data like radio map data. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a communication interface 303 which is configured to communicate via a communication network. Server 3 may use communication interface 303 to communicate with mobile device 2 of system 1. In the following, it is assumed that communication interface 303 is a 2G/3G/4G/5G radio transceiver which is configured and/or used for communicating via a cellular network, for example for transmitting and receiving data via communication path 100 of system 1.

The components 301 to 303 of server 3 may for example be connected with processor 300 by means of one or more serial and/or parallel busses.

It is to be understood that server 3 may comprise various other components like a user interface for receiving user input.

Figure 4:
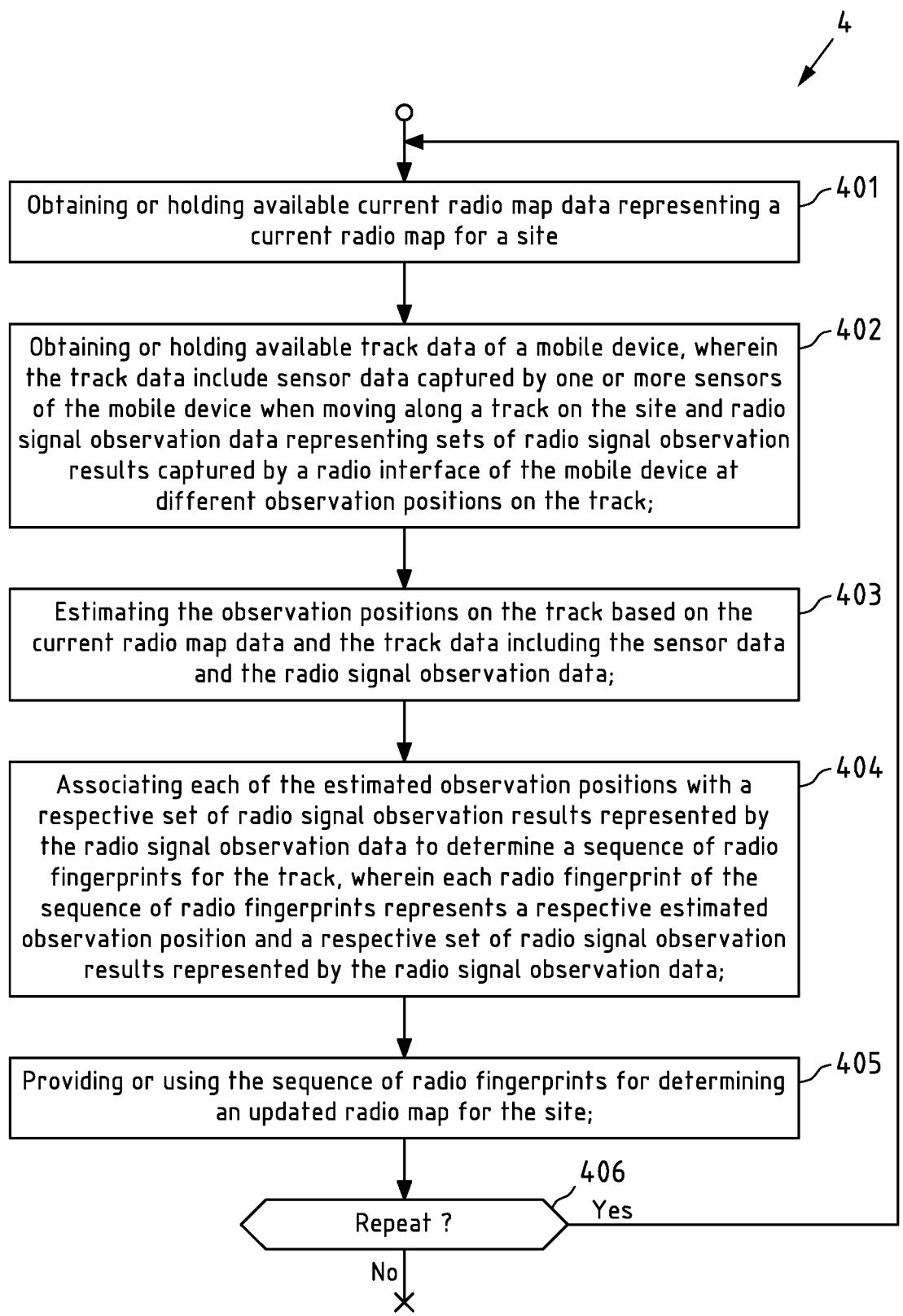
FIG. 4 is a flow chart illustrating an exemplary embodiment of a method according to the first aspect.

FIG. 4 is a flow chart 4 illustrating an exemplary embodiment of a method according to the first aspect. Without limiting the scope of the present disclosure, it is assumed in the following that mobile device 2 as disclosed above with respect to system 1 of FIG. 1 performs the steps of flow chart 4.

In a step 401, current radio map data representing a current radio map for the site are obtained or hold available. For example, the current radio map data may be received from server 3 via communication path 100 and stored in program memory 201 in step 401. Thereby, the current radio map represented by the current radio map data received and stored in step 401 may be understood to be the newest or up-to-date version of the radio map for the site received by mobile device 2 from server 3.

In a step 402, track data of mobile device 2 are obtained or hold available. In the following, it is assumed that the track data are captured by sensor(s) 204 of mobile device 2 and by WLAN- and/or Bluetooth radio transceiver of radio interface(s) 203 of mobile device and stored in program memory 201 in step 402.

The track data may represent or enable estimating the movement of mobile device 2 along a track on the site. Thereby, the track on the site may be understood to be a movement path of mobile device 2 on the site.

The track data include sensor data captured by sensor(s) 204 of mobile device 2 when moving along the track on the site. As disclosed above, sensor(s) 204 comprise a GNSS sensor and one or more inertial and/or motion sensors like an accelerometer and/or a barometer. Accordingly, the sensor data include reference position data representing at least one GNSS satellite signal based position. For example, the reference position data may represent a sequence of GNSS satellite signal based positions captured by the GNSS sensor of sensor(s) 204 when mobile device was moving along the track on the site. Alternatively, the reference position data may represent the last GNSS satellite signal based position captured by GNSS sensor of sensor(s) 204 before entering the site and/or the first GNSS satellite signal based position captured by GNSS sensor of sensor(s) 204 after leaving the site, for example if there are not GNSS satellite signals available when moving along the track on the site. Additionally, the sensor data include inertial and/or motion sensor data representing a chronological sequence of inertial and/or motion sensor captures which represent the movement of mobile device 2 when moving along the track on the site.

Moreover, the track data include radio signal observation data representing a chronological sequence of sets of radio signal observation results captured by WLAN- and/or Bluetooth radio transceiver of radio interface(s) 203 of the mobile device at different observation positions on the track (e.g. by repeatedly scanning for WLAN and/or Bluetooth radio signals when moving along the track on the site). As disclosed above, each set of radio signal observation results includes a respective indication of a received signal strength and a respective identifier of a radio node for each WLAN and/or Bluetooth radio signals observed by the WLAN- and/or Bluetooth radio transceiver of radio interface(s) 203 at the same observation position on the track on the site (i.e. the position where the mobile device 2 is/was located on the track on the site when the respective set of radio signal observation results is/was captured).

In a step 403, the observation positions on the track are estimated based on the current radio map data and the track data including the sensor data and the radio signal observation data. Accordingly, the current radio map represented by the current radio map data, the sequence of sets of radio signal observation results represented by the radio signal observation data, the at least one GNSS satellite signal based position represented by the reference position data and the sequence of inertial and/or motion sensor captures represented by the inertial and/or motion sensor data is used as input data for estimating the observation positions on the track in step 403.

For example, the observation positions are estimated by using a sensor fusion method or algorithm like a Particle or Kalman filter or smoother which receives the current radio map data and the track data including the sensor data and the radio signal observation data as input data in step 403.

In the following, it is assumed that a chronological sequence of estimated observation positions is obtained as a result of estimating the observation positions in step 403 (e.g. represented by output data of the sensor fusion method or algorithm stored in program memory 201) and that the estimated observation positions are three dimensional positions.

Subsequently, in a step 404, each of the estimated observation positions is associated with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data.

Since the estimated observation positions and the sets of radio signal observation results are available as chronological sequences in this embodiment, the sequence of radio fingerprints may be determined in step 404 by associating each estimated observation position with a respective set of radio signal observation results having the same position in the sequence like the respective estimated observation position.

As a result of the associating in step 404, the chronological sequence of radio fingerprints may be obtained and, for example, stored in program memory 201.

In a step 405, the sequence of radio fingerprints may be provided or used for determining an updated radio map for the site. Preferably, the updated radio map is determined by server 3 so that it is assumed in the following that the sequence of radio fingerprints may be transmitted to server 3 via communication path 100 in step 405. However, the invention is not limited to this so that the updated radio map may alternatively be determined based on the sequence of radio fingerprints by mobile device 2 in step 405. Exemplary steps for determining an updated radio map are disclosed below with respect to FIG. 6.

In an optional step 406, it may be determined to repeat the method of flow chart 4. For example, the method may be repeated until a respective radio model for a predefined number of radio nodes from which radio signals are expected to be observable on the site is included in the updated radio map of the current iteration (e.g. the updated radio map determined based on the sequence of radio fingerprints of the current iteration by server 3) and/or a predefined number of iterations is completed and/or the updated radio map of the current iteration (e.g. the updated radio map determined based on the sequence of radio fingerprints of the current iteration by server 3) meets a predefined radio map quality criterion.

If it is determined to repeat the method in step 406, the next iteration may for example start again with step 401 if an updated radio map is available as current radio map or step 402 if an updated radio map is not available as current radio map. It is to be understood that the data (e.g. current map data and track data) obtained or hold available may be different in each iteration of the method of flow chart 4. For example, the updated radio map of the current iteration (e.g. the updated radio map determined based on the sequence of radio fingerprints of the current iteration by server 3) may be obtained or hold available as current radio map in step 401 of the next iteration.

If it is not determined to repeat the method in step 406, the method of flow chart 4 ends.

The method of flow chart 4 only considers the case that a current radio map for the site is available. If such a current radio map is not available which may for example be the case in (an) initial iteration(s), the steps of the method of flow chart 4 may be adapted accordingly, for example no current radio map data may be obtained or hold available in step 401 and the estimating in step 403 may only be based on sensor data and reference position data included in the track data.

Figure 5:
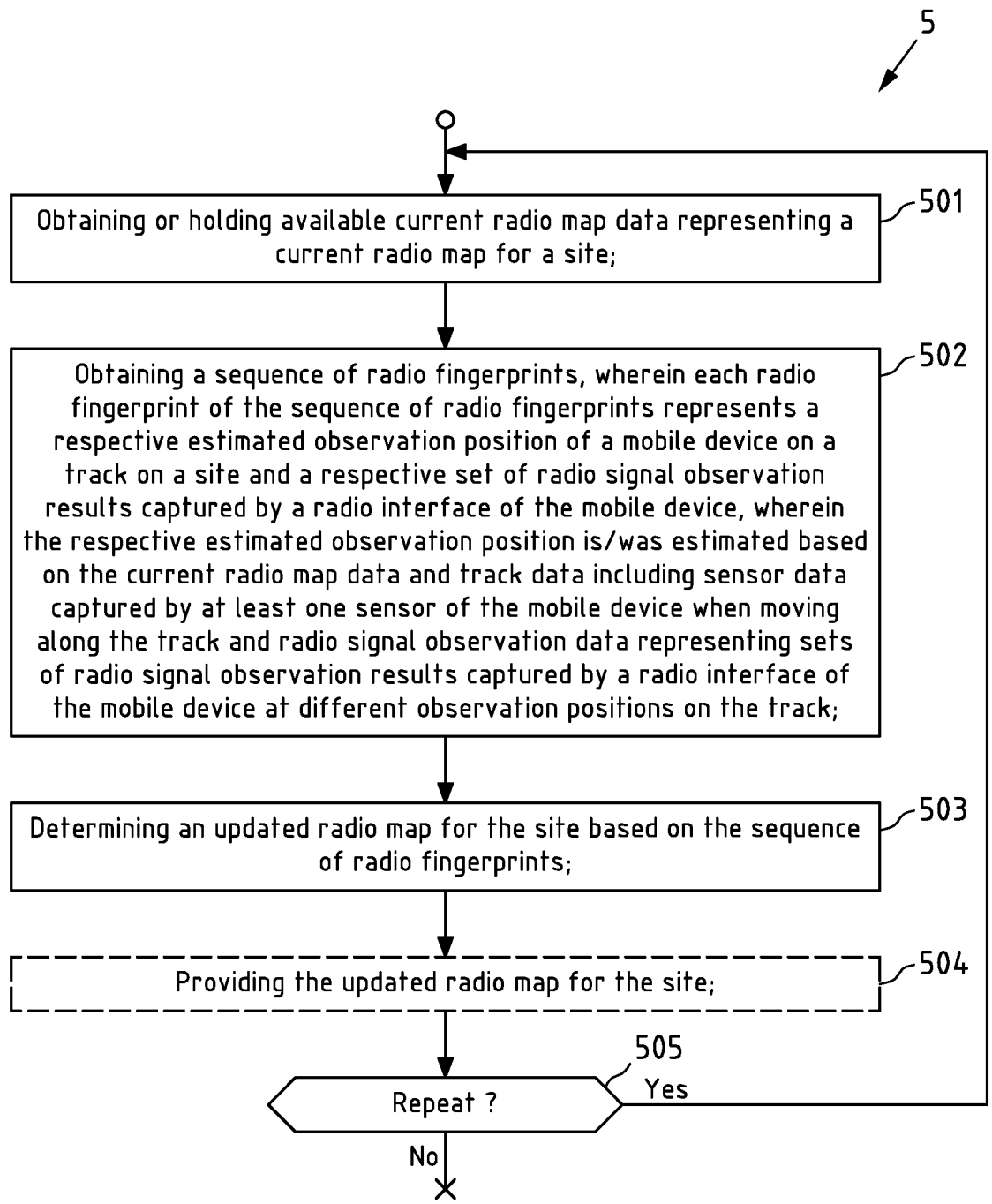
FIG. 5 is a flow chart illustrating an exemplary embodiment of a method according to the second aspect.

FIG. 5 is a flow chart 5 illustrating an exemplary embodiment of a method according to the second aspect. Without limiting the scope of the present disclosure, it is assumed in the following that server 3 as disclosed above with respect to system 1 of FIG. 1 performs the steps of flow chart 5.

In a step 501, current radio map data representing a current radio map for the site are obtained or hold available. Thereby, the current radio map represented by the current radio map may be understood to be the newest or up-to-date version of the radio map for the site. For example, the current radio map data were determined and stored in program memory 301 as updated radio map data in a previous iteration of the steps of flowchart 5.

In a step 502, a sequence of radio fingerprints is obtained.

In the following, it is assumed that the sequence of radio fingerprints obtained in step 502 corresponds to the sequence of radio fingerprints provided by mobile device 2 in step 405. For example, the sequence of radio fingerprints may be received from mobile device via communication path 100 and stored in program memory 301 in step 502. Accordingly, each radio fingerprint of the sequence of radio fingerprints obtained in step 502 represents a respective estimated observation position of mobile device 2 on the track on the site obtained as a result of the estimating in step 403 of flow chart 4 and a respective set of radio signal observation results captured by WLAN and/or Bluetooth radio transceiver of radio interface(s) 203 of mobile device 2 in step 402, wherein the respective estimated observation position is/was estimated based on the current radio map data and track data including sensor data captured by sensor(s) 204 of mobile device 2 when moving along the track and radio signal observation data representing sets of radio signal observation results captured by a WLAN and/or Bluetooth radio transceiver of radio interface(s) 203 of mobile device 2 at different observation positions on the track.

Subsequently, in a step 503, an updated radio map is determined for the site based on the sequence of radio fingerprints. This may be understood to mean that the sequence of radio fingerprints obtained in step 502 is considered (e.g. as input data) for determining (e.g. generating) the updated radio map. It is to be understood that further data may be additionally used (e.g. as input data) for determining the updated radio map. The updated radio map may be determined by using an algorithm or method for updating or generating a radio map. Exemplary steps for determining an updated radio map are disclosed below with respect to FIG. 6.

In an optional step 504, the updated radio map for the site may be provided. For example, the updated radio map may be transmitted to mobile device 2 via communication path 100 in step 504. It is to be understood that the updated radio map may only be provided if it meets a predefined minimum radio map quality criterion like a minimum accuracy or minimum completeness of the updated radio map of the current iteration. As disclosed above, the accuracy of the updated radio map may be determined according to a distance between (1) an estimated position of a mobile device estimated based on the updated radio map and (2) the real position of the mobile device on the site; and the completeness of the updated radio map may be understood to represent the ratio of the number of radio nodes from which radio signals are expected to be observable on the site to the number of radio nodes for which radio models are included in the updated radio map.

In an optional step 505, it may be determined to repeat the method of flow chart 5. For example, the method may be repeated until a respective radio model for each radio node from which radio signals are expected to be observable on the site is included in the updated radio map of the current iteration (e.g. the updated radio map determined in step 503) and/or a predefined number of iterations is completed and/or the updated radio map (e.g. the updated radio map determined in step 503) of the current iteration meets a predefined radio map quality criterion.

If it is determined to repeat the method in step 505, the next iteration may start again with step 505. It is to be understood that the data (e.g. current map data and sequence of radio fingerprints) obtained or hold available may be different in each iteration of the method of flow chart 5. For example, the updated radio map of the current iteration (e.g. the updated radio map determined in step 503) may be obtained or hold available as current radio map in step 501 of the next iteration.

If it is not determined to repeat the method in step 505, the method of flow chart 5 ends.

Like the method of flow chart 4, the method of flow chart 5 only considers the case that a current radio map for the site is available. If such a current radio map is not available which may for example be the case in (an) initial iteration(s), the steps of the method of flow chart 5 may be adapted accordingly, for example no current radio map data may be obtained or hold available in step 501. Moreover, if there is not a current radio map available for the site, neither current radio map data nor radio observation data may be used for estimating the observation positions.

Initially, iterations of the methods of flow charts 4 and 5 can thus even be performed if no current radio map is available. As soon as a current radio map is available, the current radio map data and the radio signal observation data can be additionally used for estimating the observation the observation positions which is expected to result in an improved accuracy of the estimated observation positions and an improved quality of the updated radio map (e.g. in terms of accuracy). The methods thus provide a simple and flexible solution for updating the radio map of the site which is applicable in each stage of the non-GNSS based positioning system.

Figure 6:
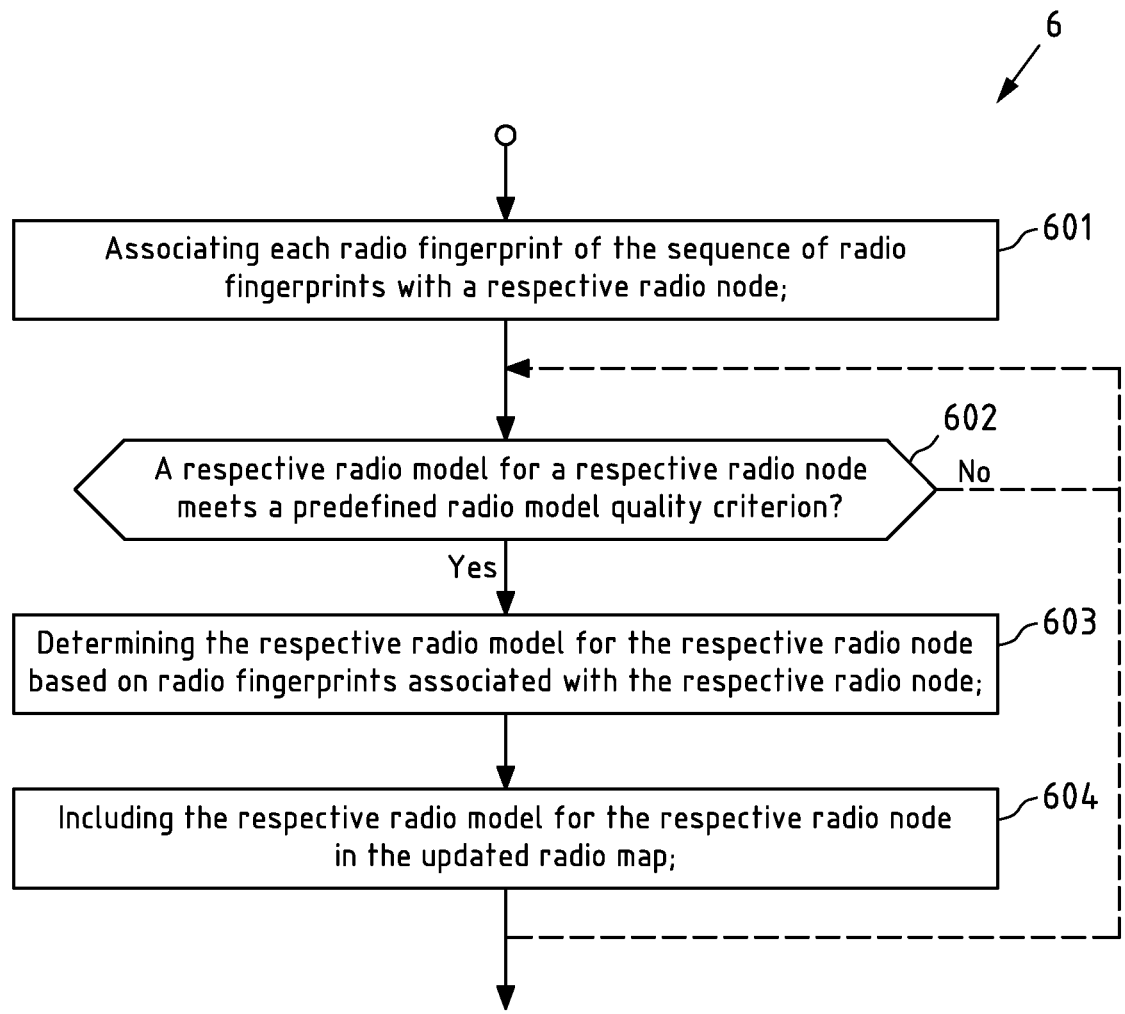
FIG. 6 is a flow chart illustrating exemplary steps of determining an updated radio map according to the aspects.

FIG. 6 is a flow chart 6 illustrating exemplary steps of determining an updated radio map according to the aspects.

In a step 601, each radio fingerprint of the sequence of radio fingerprints is associated with a respective radio node. For example, each radio fingerprint of the sequence of radio fingerprints is associated with each radio node for which a respective identifier is included in the set of radio signal observation results represented by the respective radio fingerprint.

Each radio node which is associated with at least one radio fingerprint representing an estimated observation position on the site (e.g. at least one radio fingerprint of the sequence of radio fingerprints) may be understood to be a respective radio node from which radio signals are expected to be observable on the site. Such radio nodes may form or may be part of the plurality of radio nodes from each of which radio signals are expected to be observable on the site. The radio map for the site may be considered to be complete if it includes a respective radio model for each radio node from which radio signals are expected to be observable on the site. Accordingly, if a radio fingerprint is associated with a respective radio node in step 601, it is to be understood to be associated with the radio model of the respective node.

The associations between radio fingerprints and radio nodes or a representation (e.g. a database) thereof may be stored in program memory 301.

In a step 602, it is determined whether a respective radio model for a respective radio node meets at least one predefined radio model quality criterion. The predefined radio model quality criterion may be selected such that it is expected that radio models meeting the radio model quality criterion meet a desired accuracy.

For example, the predefined radio model quality criterion is at least one of:
(1) more than a predefined number of radio fingerprints representing a respective set of radio signal observation results including an indication of a received signal strength which is greater than a predefined received signal strength threshold is associated with the respective radio model;
(2) more than a predefined number of radio fingerprints representing both:
a respective set of radio signal observation results including an indication of a received signal strength which is greater than a predefined received signal strength threshold and
a respective estimated observation position within a predefined distance from each other
is associated with the respective radio model;
(3) less than a predefined number or proportion of radio fingerprints associated with the respective radio model is determined to be a potential outlier; or
(4) radio fingerprints associated with the respective radio model originate from more than a predefined number of sequences of radio fingerprints for different tracks.

If it is determined that the respective radio model for the respective radio node meets the predefined radio model quality criterion or a predefined combination of radio model quality criteria, it is continued with step 603. Otherwise, step 602 may be repeated with another respective radio model for another respective radio node from which radio signals are expected to be observable on the site.

In a step 603, the respective radio model for the respective radio node is determined based on radio fingerprints associated with the respective radio node.

In the following, it is assumed that the respective radio model represents a geometric radio model for the respective radio node and an estimated position of the respective radio node. Accordingly, determining the respective radio model comprises:
estimating a position of the respective radio node based on sets of radio signal observation results of radio fingerprints associated with the respective radio node; and
determining a geometric radio model for the respective radio node based on sets of radio signal observation results of radio fingerprints associated with the respective radio node.

As disclosed above, a position of the respective radio node may be estimated as a weighted average of estimated observation positions represented by the radio fingerprints associated with the radio node.

As further disclosed above, a geometric radio model for the respective radio node may for example be determined as geometric shape of the geometric radio model such that it encompasses at least an estimated position of the respective radio node and a predefined percentage (e.g. 90% or 95% or 100%) of estimated observation positions represented by the radio fingerprints associated with the radio node. Moreover, only estimated observation positions represented by the radio fingerprints associated with the radio node which indicate, with the identifier of the radio node, a received signal strength in the respective set of radio signal observation results which is greater than a predefined received signal strength threshold may be used for determining the geometric radio model. For example, a geometric radio model may be a polygon, a rectangle and/or a square, a cuboid and/or a cube, an ellipse and/or a circle, an ellipsoid and/or a sphere.

In a step 604, the respective radio model for the respective radio node is included in the updated radio map.

Including the respective radio model for the respective radio node in the updated radio map may be understood to mean that the respective radio model is added to the current radio map to determine the updated radio map.

As a result of step 604 updated radio map data representing the updated radio map (i.e. including the respective radio model for the respective radio node) may be obtained and stored in program memory 301.

It is to be understood that steps 602 to 604 may be repeated for each radio model for a respective radio node from which radio signals are expected to be observable on the site.

Figure 7:
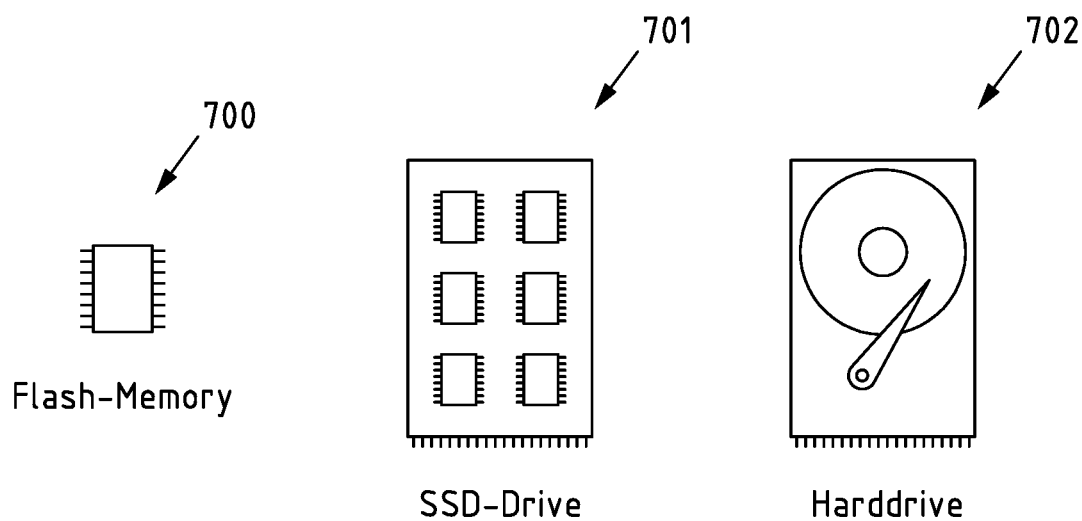
FIG. 7 is a schematic illustration of examples of tangible and non-transitory storage media according to the aspects.
Figure 7:
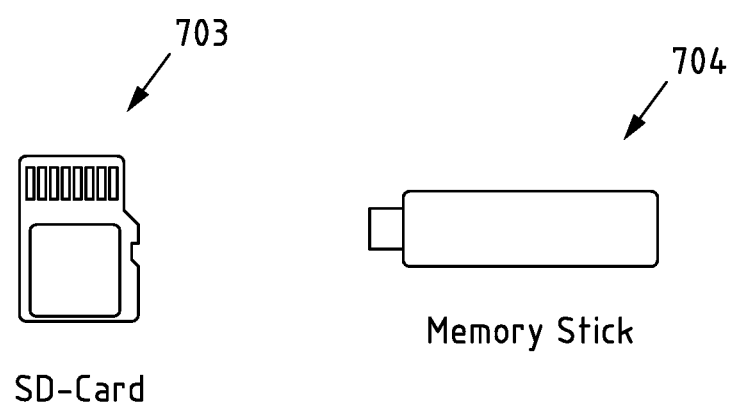
Figure 7:
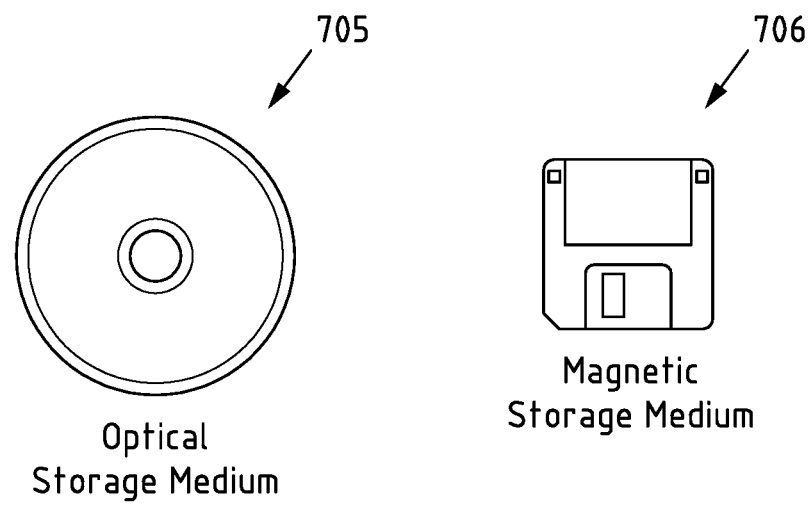

FIG. 7 is a schematic illustration of examples of tangible and non-transitory computer-readable storage media according to the aspects that may for instance be used to implement memory 201 of FIG. 2 or 301 of FIG. 3. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

The following embodiments of the disclosure are also disclosed:

Embodiment 1:

A method performed by one or more apparatuses, the method comprising in at least one iteration:
obtaining or holding available current radio map data representing a current radio map for a site;
obtaining or holding available track data of a mobile device, wherein the track data include:
sensor data captured by one or more sensors of the mobile device when moving along a track on the site, and
radio signal observation data representing sets of radio signal observation results captured by a radio interface of the mobile device at different observation positions on the track;
estimating the observation positions on the track based on the current radio map data and the track data including the sensor data and the radio signal observation data;
associating each of the estimated observation positions with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data; and providing or using the sequence of radio fingerprints for determining an updated radio map for the site.

Embodiment 2:

The method according to embodiment 1, wherein the determining the updated radio map comprises at least one of:
associating each radio fingerprint of the sequence of radio fingerprints with at least one of a respective grid point of a grid system or a respective radio node;
determining a respective radio model for at least one of a respective grid point of the grid system or a respective radio node based on radio fingerprints associated with the respective grid point or the respective radio node;
determining a respective radio model for at least one of a respective grid point of the grid system or a respective radio node based on radio fingerprints associated with the respective grid point or the respective radio node if the respective radio model meets at least one predefined radio model quality criterion;
including a respective radio model for at least one of a respective grid point of the grid system or a respective radio node in the updated radio map; or
including a respective radio model for at least one of a respective grid point of the grid system or a respective radio node in the updated radio map if the respective radio model meets at least one predefined radio model quality criterion.

Embodiment 3:

The method according to embodiment 2, wherein the determining a respective radio model for at least one of a respective grid point of the grid system or a respective radio node comprises at least one of:
estimating a position of the respective radio node based on sets of radio signal observation results of radio fingerprints associated with the respective radio node;
determining a radio coverage model for the respective radio node based on sets of radio signal observation results of radio fingerprints associated with the respective radio node;
determining an indication of radio nodes transmitting radio signals which are expected to be observable at the respective grid point based on sets of radio signal observation results of radio fingerprints associated with the respective grid point; or
determining an indication of received signal strengths of radio nodes transmitting radio signals which are expected to be observable at the respective grid point based on sets of radio signal observation results of radio fingerprints associated with the respective grid point,
determining an indication of variations of received signal strengths of radio nodes transmitting radio signals which are expected to be observable at the respective grid point based on sets of radio signal observation results of radio fingerprints associated with the respective grid point.

Embodiment 4:

The method according to any of embodiments 2 and 3, wherein the predefined radio model quality criterion is at least one of:
more than a predefined number of radio fingerprints is associated with the respective radio model;
more than a predefined number of radio fingerprints representing a respective estimated observation position within a predefined distance from each other is associated with the respective radio model;
more than a predefined number of radio fingerprints representing a respective set of radio signal observation results including an indication of a received signal strength which is greater than a predefined received signal strength threshold is associated with the respective radio model;
more than a predefined number of radio fingerprints representing both a respective set of radio signal observation results including an indication of a received signal strength which is greater than a predefined received signal strength threshold and a respective estimated observation position within a predefined distance from each other is associated with the respective radio model;
less than a predefined number or proportion of radio fingerprints associated with the respective radio model is determined to be a potential outlier; or
radio fingerprints associated with the respective radio model originate from more than a predefined number of sequences of radio fingerprints for different tracks.

Embodiment 5:

The method according to embodiment 1, wherein only radio fingerprints of the sequence of radio fingerprints meeting at least one predefined radio fingerprint quality criterion are/were used for determining the updated radio map, and/or wherein only radio signal observation results represented by the radio signal observation data included in the track data meeting at least one predefined radio signal observation result quality criterion are/were used for estimating the estimated observation positions.

Embodiment 6:

The method according to embodiment 1, wherein the method is at least repeated until at least one of:
a respective radio model for a predefined number or proportion of radio nodes from which radio signals are expected to be observable on the site is included in the updated radio map of the current iteration;

a predefined number of iterations is completed; or the updated radio map for of the current iteration meets a predefined radio map quality criterion.

Embodiment 7:

The method according to embodiment 6, wherein the updated radio map of the current iteration is obtained or hold available as current radio map in at least one further iteration of the method.

Embodiment 8:

The method according to embodiment 1, wherein the track data further include reference position data representing or enabling determining at least one reference position of the mobile device when moving along the track.

Embodiment 9:

The method according to embodiment 1, wherein each set of radio signal observation results includes for each observed radio signal at least one of:

a respective indication of a received signal strength;

a respective indication of a signal-to-noise ratio; or a respective identifier of a radio node.

Embodiment 10:

The method according to embodiment 1, wherein the sensor data are inertial and/or motion sensor data, and/or wherein the one or more sensors of the mobile device comprise at least one of the following inertial and/or motion sensors:

a gyroscope, a velocity sensor, an accelerometer, a compass, or a barometer.

Embodiment 11:

An apparatus comprising at least one processor and at least one memory containing computer program code, the at least one memory and the computer program code with the at least one processor configured to cause the respective apparatus at least to perform in at least one iteration:

obtaining or holding available current radio map data representing a current radio map for a site;

obtaining or holding available track data of a mobile device, wherein the track data include:

sensor data captured by one or more sensors of the mobile device when moving along a track on the site, and radio signal observation data representing sets of radio signal observation results captured by a radio interface of the mobile device at different observation positions on the track;

estimating the observation positions on the track based on the current radio map data and the track data including the sensor data and the radio signal observation data;

associating each of the estimated observation positions with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data; and providing or using the sequence of radio fingerprints for determining an updated radio map for the site.

Embodiment 12:

The apparatus according to embodiment 11, wherein the determining the updated radio map comprises at least one of:

associating each radio fingerprint of the sequence of radio fingerprints with at least one of a respective grid point of a grid system or a respective radio node;

determining a respective radio model for at least one of a respective grid point of the grid system or a respective radio node based on radio fingerprints associated with the respective grid point or the respective radio node;

determining a respective radio model for at least one of a respective grid point of the grid system or a respective radio node based on radio fingerprints associated with the respective grid point or the respective radio node if the respective radio model meets at least one predefined radio model quality criterion;

including a respective radio model for at least one of a respective grid point of the grid system or a respective radio node in the updated radio map; or including a respective radio model for at least one of a respective grid point of the grid system or a respective radio node in the updated radio map if the respective radio model meets at least one predefined radio model quality criterion.

Embodiment 13:

The apparatus according to embodiment 12, wherein the determining a respective radio model for at least one of a respective grid point of the grid system or a respective radio node comprises at least one of:

estimating a position of the respective radio node based on sets of radio signal observation results of radio fingerprints associated with the respective radio node;

determining a radio coverage model for the respective radio node based on sets of radio signal observation results of radio fingerprints associated with the respective radio node;

determining an indication of radio nodes transmitting radio signals which are expected to be observable at the respective grid point based on sets of radio signal observation results of radio fingerprints associated with the respective grid point; or determining an indication of received signal strengths of radio nodes transmitting radio signals which are expected to be observable at the respective grid point based on sets of radio signal observation results of radio fingerprints associated with the respective grid point, determining an indication of variations of received signal strengths of radio nodes transmitting radio signals which are expected to be observable at the respective grid point based on sets of radio signal observation results of radio fingerprints associated with the respective grid point.

Embodiment 14:

The apparatus according to any of embodiments 12 and 13, wherein the predefined radio model quality criterion is at least one of:

more than a predefined number of radio fingerprints is associated with the respective radio model;

more than a predefined number of radio fingerprints representing a respective estimated observation position within a predefined distance from each other is associated with the respective radio model;

more than a predefined number of radio fingerprints representing a respective set of radio signal observation results including an indication of a received signal strength which is greater than a predefined received signal strength threshold is associated with the respective radio model;
more than a predefined number of radio fingerprints representing both a respective set of radio signal observation results including an indication of a received signal strength which is greater than a predefined received signal strength threshold and a respective estimated observation position within a predefined distance from each other is associated with the respective radio model;
less than a predefined number or proportion of radio fingerprints associated with the respective radio model is determined to be a potential outlier; or
radio fingerprints associated with the respective radio model originate from more than a predefined number of sequences of radio fingerprints for different tracks.

Embodiment 15:
The apparatus according to embodiment 11, wherein only radio fingerprints of the sequence of radio fingerprints meeting at least one predefined radio fingerprint quality criterion are/were used for determining the updated radio map, and/or wherein only radio signal observation results represented by the radio signal observation data included in the track data meeting at least one predefined radio signal observation result quality criterion are/were used for estimating the estimated observation positions.

Embodiment 16:
The apparatus according to embodiment 11, wherein the steps performed in the at least one iteration are at least repeated until at least one of:
a respective radio model for a predefined number or proportion of radio nodes from which radio signals are expected to be observable on the site is included in the updated radio map of the current iteration;
a predefined number of iterations is completed; or
the updated radio map for of the current iteration meets a predefined radio map quality criterion.

Embodiment 17:
The apparatus according to embodiment 11, wherein the updated radio map of the current iteration is obtained or hold available as current radio map in at least one further iteration of the method.

Embodiment 18:
The apparatus according to embodiment 11, wherein the track data further include reference position data representing or enabling determining at least one reference position of the mobile device when moving along the track.

Embodiment 19:
The apparatus according to embodiment 11, wherein each set of radio signal observation results includes for each observed radio signal at least one of:
a respective indication of a received signal strength;
a respective indication of a signal-to-noise ratio; or
a respective identifier of a radio node.

Embodiment 20:
The apparatus according to embodiment 11, wherein the sensor data are inertial and/or motion sensor data, and/or wherein the one or more sensors of the mobile device comprise at least one of the following inertial and/or motion sensors:
a gyroscope,
a velocity sensor,
an accelerometer,
a compass, or
a barometer.

Embodiment 21:
A method performed by one or more apparatuses, the method comprising in at least one iteration:
obtaining or holding available current radio map data representing a current radio map for a site;
obtaining a sequence of radio fingerprints, wherein each radio fingerprint of the sequence of radio fingerprints represents a respective estimated observation position of a mobile device on a track on the site and a respective set of radio signal observation results captured by a radio interface of the mobile device, wherein the respective estimated observation position is/was estimated based on the current radio map data and track data including sensor data captured by at least one sensor of the mobile device when moving along the track and radio signal observation data representing sets of radio signal observation results captured by a radio interface of the mobile device at different observation positions on the track; and
determining an updated radio map for the site based on the sequence of radio fingerprints.

Embodiment 22:
The method according to embodiment 21, wherein the determining the updated radio map comprises at least one of:
associating each radio fingerprint of the sequence of radio fingerprints with at least one of a respective grid point of a grid system or a respective radio node;
determining a respective radio model for at least one of a respective grid point of the grid system or a respective radio node based on radio fingerprints associated with the respective grid point or the respective radio node;
determining a respective radio model for at least one of a respective grid point of the grid system or a respective radio node based on radio fingerprints associated with the respective grid point or the respective radio node if the respective radio model meets at least one predefined radio model quality criterion;
including a respective radio model for at least one of a respective grid point of the grid system or a respective radio node in the updated radio map; or
including a respective radio model for at least one of a respective grid point of the grid system or a respective radio node in the updated radio map if the respective radio model meets at least one predefined radio model quality criterion.

Embodiment 23:
The method according to embodiment 22, wherein the determining a respective radio model for at least one of a respective grid point of the grid system or a respective radio node comprises at least one of:
estimating a position of the respective radio node based on sets of radio signal observation results of radio fingerprints associated with the respective radio node;
determining a radio coverage model for the respective radio node based on sets of radio signal observation results of radio fingerprints associated with the respective radio node;
determining an indication of radio nodes transmitting radio signals which are expected to be observable at the respective grid point based on sets of radio signal observation results of radio fingerprints associated with the respective grid point; or
determining an indication of received signal strengths of radio nodes transmitting radio signals which are expected to be observable at the respective grid point based on sets of radio signal observation results of radio fingerprints associated with the respective grid point, determining an indication of variations of received signal strengths of radio nodes transmitting radio signals which are expected to be observable at the respective grid point based on sets of radio signal observation results of radio fingerprints associated with the respective grid point.

Embodiment 24:

The method according to any of embodiments 22 and 23, wherein the predefined radio model quality criterion is at least one of:

more than a predefined number of radio fingerprints is associated with the respective radio model;

more than a predefined number of radio fingerprints representing a respective estimated observation position within a predefined distance from each other is associated with the respective radio model;

more than a predefined number of radio fingerprints representing a respective set of radio signal observation results including an indication of a received signal strength which is greater than a predefined received signal strength threshold is associated with the respective radio model;

more than a predefined number of radio fingerprints representing both a respective set of radio signal observation results including an indication of a received signal strength which is greater than a predefined received signal strength threshold and a respective estimated observation position within a predefined distance from each other is associated with the respective radio model;

less than a predefined number or proportion of radio fingerprints associated with the respective radio model is determined to be a potential outlier; or radio fingerprints associated with the respective radio model originate from more than a predefined number of sequences of radio fingerprints for different tracks.

Embodiment 25:

The method according to embodiment 21, wherein only radio fingerprints of the sequence of radio fingerprints meeting at least one predefined radio fingerprint quality criterion are/were used for determining the updated radio map, and/or wherein only radio signal observation results represented by the radio signal observation data included in the track data meeting at least one predefined radio signal observation result quality criterion are/were used for estimating the estimated observation positions.

Embodiment 26:

The method according to embodiment 21, wherein the method is at least repeated until at least one of:

a respective radio model for a predefined number or proportion of radio nodes from which radio signals are expected to be observable on the site is included in the updated radio map of the current iteration;

a predefined number of iterations is completed; or the updated radio map for of the current iteration meets a predefined radio map quality criterion.

Embodiment 27:

The method according to embodiment 26, wherein the updated radio map of the current iteration is obtained or hold available as current radio map in at least one further iteration of the method.

Embodiment 28:

The method according to embodiment 21, wherein the track data further include reference position data representing or enabling determining at least one reference position of the mobile device when moving along the track.

Embodiment 29:

The method according to embodiment 21, wherein each set of radio signal observation results includes for each observed radio signal at least one of:

a respective indication of a received signal strength;

a respective indication of a signal-to-noise ratio; or a respective identifier of a radio node.

Embodiment 30:

The method according to embodiment 21, wherein the sensor data are inertial and/or motion sensor data, and/or wherein the one or more sensors of the mobile device comprise at least one of the following inertial and/or motion sensors:

a gyroscope, a velocity sensor, an accelerometer, a compass, or a barometer.

Embodiment 31:

An apparatus comprising at least one processor and at least one memory containing computer program code, the at least one memory and the computer program code with the at least one processor configured to cause the respective apparatus at least to perform in at least one iteration:

obtaining or holding available current radio map data representing a current radio map for a site;

obtaining a sequence of radio fingerprints, wherein each radio fingerprint of the sequence of radio fingerprints represents a respective estimated observation position of a mobile device on a track on the site and a respective set of radio signal observation results captured by a radio interface of the mobile device, wherein the respective estimated observation position is/was estimated based on the current radio map data and track data including sensor data captured by at least one sensor of the mobile device when moving along the track and radio signal observation data representing sets of radio signal observation results captured by a radio interface of the mobile device at different observation positions on the track; and determining an updated radio map for the site based on the sequence of radio fingerprints.

Embodiment 32:

The apparatus according to embodiment 31, wherein the determining the updated radio map comprises at least one of:

associating each radio fingerprint of the sequence of radio fingerprints with at least one of a respective grid point of a grid system or a respective radio node;

determining a respective radio model for at least one of a respective grid point of the grid system or a respective radio node based on radio fingerprints associated with the respective grid point or the respective radio node;

determining a respective radio model for at least one of a respective grid point of the grid system or a respective radio node based on radio fingerprints associated with the respective grid point or the respective radio node if the respective radio model meets at least one predefined radio model quality criterion;

including a respective radio model for at least one of a respective grid point of the grid system or a respective radio node in the updated radio map; or including a respective radio model for at least one of a respective grid point of the grid system or a respective radio node in the updated radio map if the respective radio model meets at least one predefined radio model quality criterion.

Embodiment 33:

The apparatus according to embodiment 32, wherein the determining a respective radio model for at least one of a respective grid point of the grid system or a respective radio node comprises at least one of:

estimating a position of the respective radio node based on sets of radio signal observation results of radio fingerprints associated with the respective radio node;

determining a radio coverage model for the respective radio node based on sets of radio signal observation results of radio fingerprints associated with the respective radio node;

determining an indication of radio nodes transmitting radio signals which are expected to be observable at the respective grid point based on sets of radio signal observation results of radio fingerprints associated with the respective grid point; or determining an indication of received signal strengths of radio nodes transmitting radio signals which are expected to be observable at the respective grid point based on sets of radio signal observation results of radio fingerprints associated with the respective grid point, determining an indication of variations of received signal strengths of radio nodes transmitting radio signals which are expected to be observable at the respective grid point based on sets of radio signal observation results of radio fingerprints associated with the respective grid point.

Embodiment 34:

The apparatus according to any of embodiments 32 and 33, wherein the predefined radio model quality criterion is at least one of:

more than a predefined number of radio fingerprints is associated with the respective radio model;

more than a predefined number of radio fingerprints representing a respective estimated observation position within a predefined distance from each other is associated with the respective radio model;

more than a predefined number of radio fingerprints representing a respective set of radio signal observation results including an indication of a received signal strength which is greater than a predefined received signal strength threshold is associated with the respective radio model;

more than a predefined number of radio fingerprints representing both a respective set of radio signal observation results including an indication of a received signal strength which is greater than a predefined received signal strength threshold and a respective estimated observation position within a predefined distance from each other is associated with the respective radio model;

less than a predefined number or proportion of radio fingerprints associated with the respective radio model is determined to be a potential outlier; or radio fingerprints associated with the respective radio model originate from more than a predefined number of sequences of radio fingerprints for different tracks.

Embodiment 35:

The apparatus according to embodiment 31, wherein only radio fingerprints of the sequence of radio fingerprints meeting at least one predefined radio fingerprint quality criterion are/were used for determining the updated radio map, and/or wherein only radio signal observation results represented by the radio signal observation data included in the track data meeting at least one predefined radio signal observation result quality criterion are/were used for estimating the estimated observation positions.

Embodiment 36:

The apparatus according to embodiment 31, wherein the steps performed in the at least one iteration are at least repeated until at least one of:

a respective radio model for a predefined number or proportion of radio nodes from which radio signals are expected to be observable on the site is included in the updated radio map of the current iteration;

a predefined number of iterations is completed; or the updated radio map for of the current iteration meets a predefined radio map quality criterion.

Embodiment 37:

The apparatus according to embodiment 31, wherein the updated radio map of the current iteration is obtained or hold available as current radio map in at least one further iteration of the method.

Embodiment 38:

The apparatus according to embodiment 31, wherein the track data further include reference position data representing or enabling determining at least one reference position of the mobile device when moving along the track.

Embodiment 39:

The apparatus according to embodiment 31, wherein each set of radio signal observation results includes for each observed radio signal at least one of:

a respective indication of a received signal strength;

a respective indication of a signal-to-noise ratio; or a respective identifier of a radio node.

Embodiment 40:

The apparatus according to embodiment 31, wherein the sensor data are inertial and/or motion sensor data, and/or wherein the one or more sensors of the mobile device comprise at least one of the following inertial and/or motion sensors:

a gyroscope, a velocity sensor, an accelerometer, a compass, or a barometer.

Embodiment 41:

The apparatus according to any of embodiments 11 and 31 wherein the apparatus is one of a mobile device or a module for a mobile device or a server or a module for a server or part of a server cloud.

Embodiment 42:

A non-transitory computer readable storage medium, in which computer program code is stored, wherein the computer program code causes an apparatus, when executed by a processor of the apparatus, to perform in at least one iteration:

obtaining or holding available current radio map data representing a current radio map for a site;

obtaining or holding available track data of a mobile device, wherein the track data include:
  sensor data captured by one or more sensors of the mobile device when moving along a track on the site, and
  radio signal observation data representing sets of radio signal observation results captured by a radio interface of the mobile device at different observation positions on the track;
estimating the observation positions on the track based on the current radio map data and the track data including the sensor data and the radio signal observation data;
associating each of the estimated observation positions with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data; and
providing or using the sequence of radio fingerprints for determining an updated radio map for the site.

Embodiment 43:

A non-transitory computer readable storage medium, in which computer program code is stored, wherein the computer program code causes an apparatus, when executed by a processor of the apparatus, to perform in at least one iteration:
obtaining or holding available current radio map data representing a current radio map for a site;
obtaining a sequence of radio fingerprints, wherein each radio fingerprint of the sequence of radio fingerprints represents a respective estimated observation position of a mobile device on a track on the site and a respective set of radio signal observation results captured by a radio interface of the mobile device, wherein the respective estimated observation position is/was estimated based on the current radio map data and track data including sensor data captured by at least one sensor of the mobile device when moving along the track and radio signal observation data representing sets of radio signal observation results captured by a radio interface of the mobile device at different observation positions on the track; and
determining an updated radio map for the site based on the sequence of radio fingerprints.

Embodiment 44:

A system comprising one or more servers and one or more mobile devices, each comprising at least one processor and at least one memory containing computer program code, the memories and the computer program codes with the processors configured to cause the one or more servers and the one or more mobile devices to cooperate to perform in at least one iteration:
obtaining or holding available current radio map data representing a current radio map for a site;
obtaining or holding available track data of a mobile device, wherein the track data include:
  sensor data captured by one or more sensors of the mobile device when moving along a track on the site, and
  radio signal observation data representing sets of radio signal observation results captured by a radio interface of the mobile device at different observation positions on the track;
estimating the observation positions on the track based on the current radio map data and the track data including the sensor data and the radio signal observation data;
associating each of the estimated observation positions with a respective set of radio signal observation results represented by the radio signal observation data to determine a sequence of radio fingerprints for the track, wherein each radio fingerprint of the sequence of radio fingerprints represents a respective estimated observation position and a respective set of radio signal observation results represented by the radio signal observation data; and
providing or using the sequence of radio fingerprints for determining an updated radio map for the site.

Embodiment 45:

A system comprising one or more servers and one or more mobile devices, each comprising at least one processor and at least one memory containing computer program code, the memories and the computer program codes with the processors configured to cause the one or more servers and the one or more mobile devices to cooperate to perform in at least one iteration:
obtaining or holding available current radio map data representing a current radio map for a site;
obtaining a sequence of radio fingerprints, wherein each radio fingerprint of the sequence of radio fingerprints represents a respective estimated observation position of a mobile device on a track on the site and a respective set of radio signal observation results captured by a radio interface of the mobile device, wherein the respective estimated observation position is/was estimated based on the current radio map data and track data including sensor data captured by at least one sensor of the mobile device when moving along the track and radio signal observation data representing sets of radio signal observation results captured by a radio interface of the mobile device at different observation positions on the track; and
determining an updated radio map for the site based on the sequence of radio fingerprints.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
  (a) hardware-only circuit implementations (such as implementations in only analog and/or digital circuitry)
  (b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
  (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 100 of FIG. 1 could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by one or more apparatuses, said method comprising in at least one iteration:
    obtaining or holding available current radio map data representing a current radio map for a site;
    obtaining or holding available track data of a mobile device, wherein said track data include:
        sensor data captured by one or more sensors of said mobile device when moving along a track on said site, and
        radio signal observation data representing sets of radio signal observation results captured by a radio interface of said mobile device at different observation positions on said track;
    estimating said observation positions on said track based on said current radio map data and said track data including said sensor data and said radio signal observation data;
    associating each of said estimated observation positions with a respective set of radio signal observation results represented by said radio signal observation data to determine a sequence of radio fingerprints for said track, wherein each radio fingerprint of said sequence of radio fingerprints represents a respective estimated observation position and a respective set of radio signal observation results represented by said radio signal observation data; and
    providing or using said sequence of radio fingerprints for determining an updated radio map for said site.

2. The method according to claim 1, wherein said determining said updated radio map comprises at least one of:
    associating each radio fingerprint of said sequence of radio fingerprints with at least one of a respective radio grid point of a grid system or a respective radio node;
    determining a respective radio model for at least one of a respective grid point of said grid system or a respective radio node based on radio fingerprints associated with said respective grid point or said respective radio node;
    determining a respective radio model for at least one of a respective grid point of said grid system or a respective radio node based on radio fingerprints associated with said respective grid point or said respective radio node if said respective radio model meets at least one predefined radio model quality criterion;
    including a respective radio model for at least one of a respective grid point of said grid system or a respective radio node in said updated radio map; or
    including a respective radio model for at least one of a respective grid point of said grid system or a respective radio node in said updated radio map if said respective radio model meets at least one predefined radio model quality criterion.

3. The method according to claim 2, wherein said determining a respective radio model for at least one of a respective grid point of said grid system or a respective radio node comprises at least one of:
    estimating a position of said respective radio node based on sets of radio signal observation results of radio fingerprints associated with said respective radio node;
    determining a radio coverage model for said respective radio node based on sets of radio signal observation results of radio fingerprints associated with said respective radio node;
    determining an indication of radio nodes transmitting radio signals which are expected to be observable at the respective grid point based on sets of radio signal observation results of radio fingerprints associated with said respective grid point;
    determining an indication of received signal strengths of radio nodes transmitting radio signals which are expected to be observable at the respective grid point based on sets of radio signal observation results of radio fingerprints associated with said respective grid point; or
    determining an indication of variations of received signal strengths of radio nodes transmitting radio signals which are expected to be observable at the respective grid point based on sets of radio signal observation results of radio fingerprints associated with said respective grid point.

4. The method according to claim 2, wherein said predefined radio model quality criterion is at least one of:
    more than a predefined number of radio fingerprints is associated with said respective radio model;
    more than a predefined number of radio fingerprints representing a respective estimated observation position within a predefined distance from each other is associated with said respective radio model;
    more than a predefined number of radio fingerprints representing a respective set of radio signal observation results including an indication of a received signal strength which is greater than a predefined received signal strength threshold is associated with said respective radio model;
    more than a predefined number of radio fingerprints representing both a respective set of radio signal observation results including an indication of a received signal strength which is greater than a predefined received signal strength threshold and a respective estimated observation position within a predefined distance from each other is associated with said respective radio model;
less than a predefined number or proportion of radio fingerprints associated with said respective radio model is determined to be a potential outlier; or
radio fingerprints associated with said respective radio model originate from more than a predefined number of sequences of radio fingerprints for different tracks.

5. The method according to claim 1, wherein only radio fingerprints of said sequence of radio fingerprints meeting at least one predefined radio fingerprint quality criterion are/were used for determining said updated radio map, and/or wherein only radio signal observation results represented by said radio signal observation data included in said track data meeting at least one predefined radio signal observation result quality criterion are/were used for estimating said estimated observation positions.

6. The method according to claim 1, wherein said method is at least repeated until at least one of:
a respective radio model for a predefined number or proportion of radio nodes from which radio signals are expected to be observable on the site is included in said updated radio map of said current iteration;
a predefined number of iterations is completed; or
said updated radio map of said current iteration meets a predefined radio map quality criterion.

7. The method according to claim 1, wherein said updated radio map of said current iteration is obtained or held available as the current radio map in at least one further iteration of said method.

8. A method performed by one or more apparatuses, said method comprising in at least one iteration:
obtaining or holding available current radio map data representing a current radio map for a site;
obtaining a sequence of radio fingerprints, wherein each radio fingerprint of said sequence of radio fingerprints represents a respective estimated observation position of a mobile device on a track on said site and a respective set of radio signal observation results captured by a radio interface of said mobile device, wherein said respective estimated observation position is/was estimated based on said current radio map data and track data including sensor data captured by at least one sensor of said mobile device when moving along said track and radio signal observation data representing sets of radio signal observation results captured by the radio interface of said mobile device at different observation positions on said track; and
determining an updated radio map for said site based on said sequence of radio fingerprints.

9. The method according to claim 8, wherein said determining said updated radio map comprises at least one of:
associating each radio fingerprint of said sequence of radio fingerprints with at least one of a respective grid point of a grid system or a respective radio node;
determining a respective radio model for at least one of a respective grid point of said grid system or a respective radio node based on radio fingerprints associated with said respective grid point or said respective radio node;
determining a respective radio model for at least one of a respective grid point of said grid system or a respective radio node based on radio fingerprints associated with said respective grid point or said respective radio node if said respective radio model meets at least one predefined radio model quality criterion;
including a respective radio model for at least one of a respective grid point of said grid system or a respective radio node in said updated radio map; or
including a respective radio model for at least one of a respective grid point of said grid system or a respective radio node in said updated radio map if said respective radio model meets at least one predefined radio model quality criterion.

10. The method according to claim 9, wherein said determining a respective radio model for at least one of a respective grid point of said grid system or a respective radio node comprises at least one of:
estimating a position of said respective radio node based on sets of radio signal observation results of radio fingerprints associated with said respective radio node;
determining a radio coverage model for said respective radio node based on sets of radio signal observation results of radio fingerprints associated with said respective radio node;
determining an indication of radio nodes transmitting radio signals which are expected to be observable at the respective grid point based on sets of radio signal observation results of radio fingerprints associated with said respective grid point;
determining an indication of received signal strengths of radio nodes transmitting radio signals which are expected to be observable at the respective grid point based on sets of radio signal observation results of radio fingerprints associated with said respective grid point; or
determining an indication of variations of received signal strengths of radio nodes transmitting radio signals which are expected to be observable at the respective grid point based on sets of radio signal observation results of radio fingerprints associated with said respective grid point.

11. The method according to claim 9, wherein said predefined radio model quality criterion is at least one of:
more than a predefined number of radio fingerprints is associated with said respective radio model;
more than a predefined number of radio fingerprints representing a respective estimated observation position within a predefined distance from each other is associated with said respective radio model;
more than a predefined number of radio fingerprints representing a respective set of radio signal observation results including an indication of a received signal strength which is greater than a predefined received signal strength threshold is associated with said respective radio model;
more than a predefined number of radio fingerprints representing both a respective set of radio signal observation results including an indication of a received signal strength which is greater than a predefined received signal strength threshold and a respective estimated observation position within a predefined distance from each other is associated with said respective radio model;
less than a predefined number or proportion of radio fingerprints associated with said respective radio model is determined to be a potential outlier; or
radio fingerprints associated with said respective radio model originate from more than a predefined number of sequences of radio fingerprints for different tracks.

12. The method according to claim 8, wherein only radio fingerprints of said sequence of radio fingerprints meeting at least one predefined radio fingerprint quality criterion are/were used for determining said updated radio map, and/or wherein only radio signal observation results represented by said radio signal observation data included in said track data meeting at least one predefined radio signal observation result quality criterion are/were used for estimating said estimated observation positions.

13. The method according to claim 8, wherein said method is at least repeated until at least one of:
a respective radio model for a predefined number or proportion of radio nodes from which radio signals are expected to be observable on the site is included in said updated radio map of said current iteration;
a predefined number of iterations is completed; or
said updated radio map of said current iteration meets a predefined radio map quality criterion.

14. The method according to claim 8, wherein said updated radio map of said current iteration is obtained or held available as the current radio map in at least one further iteration of said method.

15. An apparatus comprising at least one processor and at least one memory containing computer program code, the at least one memory and the computer program code with the at least one processor configured to cause the apparatus at least to perform in at least one iteration:
obtaining or holding available current radio map data representing a current radio map for a site;
obtaining or holding available track data of a mobile device, wherein said track data include:
sensor data captured by one or more sensors of said mobile device when moving along a track on said site, and
radio signal observation data representing sets of radio signal observation results captured by a radio interface of said mobile device at different observation positions on said track;
estimating said observation positions on said track based on said current radio map data and said track data including said sensor data and said radio signal observation data;
associating each of said estimated observation positions with a respective set of radio signal observation results represented by said radio signal observation data to determine a sequence of radio fingerprints for said track, wherein each radio fingerprint of said sequence of radio fingerprints represents a respective estimated observation position and a respective set of radio signal observation results represented by said radio signal observation data; and
providing or using said sequence of radio fingerprints for determining an updated radio map for said site.

16. The apparatus according to claim 15, wherein said determining said updated radio map comprises at least one of:
associating each radio fingerprint of said sequence of radio fingerprints with at least one of a respective grid point of a grid system or a respective radio node;
determining a respective radio model for at least one of a respective grid point of said grid system or a respective radio node based on radio fingerprints associated with said respective grid point or said respective radio node;
determining a respective radio model for at least one of a respective grid point of said grid system or a respective radio node based on radio fingerprints associated with said respective grid point or said respective radio node if said respective radio model meets at least one predefined radio model quality criterion;
including a respective radio model for at least one of a respective grid point of said grid system or a respective radio node in said updated radio map; or
including a respective radio model for at least one of a respective grid point of said grid system or a respective radio node in said updated radio map if said respective radio model meets at least one predefined radio model quality criterion.

17. The apparatus according to claim 16, wherein said determining a respective radio model for at least one of a respective grid point of said grid system or a respective radio node comprises at least one of:
estimating a position of said respective radio node based on sets of radio signal observation results of radio fingerprints associated with said respective radio node;
determining a radio coverage model for said respective radio node based on sets of radio signal observation results of radio fingerprints associated with said respective radio node;
determining an indication of radio nodes transmitting radio signals which are expected to be observable at the respective grid point based on sets of radio signal observation results of radio fingerprints associated with said respective grid point;
determining an indication of received signal strengths of radio nodes transmitting radio signals which are expected to be observable at the respective grid point based on sets of radio signal observation results of radio fingerprints associated with said respective grid point; or
determining an indication of variations of received signal strengths of radio nodes transmitting radio signals which are expected to be observable at the respective grid point based on sets of radio signal observation results of radio fingerprints associated with said respective grid point.

18. The apparatus according to claim 16, wherein said predefined radio model quality criterion is at least one of:
more than a predefined number of radio fingerprints is associated with said respective radio model;
more than a predefined number of radio fingerprints representing a respective estimated observation position within a predefined distance from each other is associated with said respective radio model;
more than a predefined number of radio fingerprints representing a respective set of radio signal observation results including an indication of a received signal strength which is greater than a predefined received signal strength threshold is associated with said respective radio model;
more than a predefined number of radio fingerprints representing both a respective set of radio signal observation results including an indication of a received signal strength which is greater than a predefined received signal strength threshold and a respective estimated observation position within a predefined distance from each other is associated with said respective radio model;
less than a predefined number or proportion of radio fingerprints associated with said respective radio model is determined to be a potential outlier; or
radio fingerprints associated with said respective radio model originate from more than a predefined number of sequences of radio fingerprints for different tracks.

19. The apparatus according to claim 15, wherein only radio fingerprints of said sequence of radio fingerprints meeting at least one predefined radio fingerprint quality criterion are/were used for determining said updated radio map, and/or wherein only radio signal observation results represented by said radio signal observation data included in said track data meeting at least one predefined radio signal observation result quality criterion are/were used for estimating said estimated observation positions.

20. The apparatus according to claim 15, wherein said updated radio map of said current iteration is obtained or held available as the current radio map in at least one further iteration.

\* \* \* \* \*